US010233359B2

(12) United States Patent
Naik et al.

(10) Patent No.: US 10,233,359 B2
(45) Date of Patent: Mar. 19, 2019

(54) METHOD FOR LABELING ITEMS WITH LABELS COMPRISING A CLEAR FACE LAYER AND A CLEAR ADHESIVE LAYER

(71) Applicant: UPM RAFLATAC OY, Tampere (FI)

(72) Inventors: Kirit Naik, Arden, NC (US); Patrick Goss, Asheville, NC (US); Tom Saxberg, Tampere (FI); Noel Mitchell, Wuppertal (DE); Ismo Pietari, Wroclaw (PL)

(73) Assignee: UPM RAFLATAC OY, Tampere (FI)

( * ) Notice: Subject to any disclaimer, the term of this patent is extended or adjusted under 35 U.S.C. 154(b) by 0 days.

(21) Appl. No.: 15/723,606

(22) Filed: Oct. 3, 2017

(65) Prior Publication Data

US 2018/0022966 A1     Jan. 25, 2018

Related U.S. Application Data

(62) Division of application No. 14/735,197, filed on Jun. 10, 2015, now Pat. No. 9,809,730.

(51) Int. Cl.
    *C09J 7/25*            (2018.01)
    *B65C 9/00*          (2006.01)
    (Continued)

(52) U.S. Cl.
    CPC .............. *C09J 7/255* (2018.01); *B32B 27/08* (2013.01); *B32B 27/308* (2013.01); *B32B 27/36* (2013.01);
    (Continued)

(58) Field of Classification Search
    USPC ........................................................ 156/249
    See application file for complete search history.

(56) References Cited

U.S. PATENT DOCUMENTS 2,613,007 A * 10/1952 Von Hofe ................. B65C 9/24
                                                                156/282
3,206,348 A * 9/1965 Holstein ................... B65C 3/20
                                                                  156/492
(Continued)

FOREIGN PATENT DOCUMENTS

DE        102012200831 A1      7/2013
EP            2535280            12/2005
(Continued)

OTHER PUBLICATIONS

Crow; "Polymer Properties Database", polymerdatabase.com, (2015) <http://polymerdatabase.com/polymer%20physics/Ref%20Index%20Table2%20.html>.

(Continued)

*Primary Examiner* — Sing P Chan
(74) *Attorney, Agent, or Firm* — Cantor Colburn LLP

(57) ABSTRACT

A method for labeling items comprises:
    separating a label from a release liner by using peel plate,
    moving the surface of an item in a first direction,
    moving the label in a second direction, and
    bringing a leading edge of the label into contact with a surface of the item such that the angle between the first direction and the second direction is in the range of 10° to 30°,
wherein the label comprises:
    a face layer, and
    an adhesive layer,
wherein the face layer comprises semi-crystalline polymeric film, the adhesive layer consists of one or more adhesive sub-layers, a lowermost adhesive sub-layer of said adhesive sub-layers comprises transparent polymeric adhesive, the thickness of the face layer is in the range of 10 μm to 50 μm, the thickness of the adhesive layer is in the range of 8 μm to (Continued)

25 µm, and the thickness of the adhesive layer is smaller than 95% of thickness of the face layer.

20 Claims, 18 Drawing Sheets

(51) Int. Cl.
*G09F 3/10* (2006.01)
*B32B 27/30* (2006.01)
*B32B 27/36* (2006.01)
*B32B 27/08* (2006.01)
*G09F 3/02* (2006.01)

(52) U.S. Cl.
CPC .............. *B65C 9/0006* (2013.01); *G09F 3/10* (2013.01); *B32B 2307/412* (2013.01); *B32B 2307/418* (2013.01); *B32B 2307/536* (2013.01); *B32B 2307/54* (2013.01); *B32B 2307/704* (2013.01); *B32B 2307/724* (2013.01); *B32B 2307/75* (2013.01); *B32B 2405/00* (2013.01); *B32B 2519/00* (2013.01); *C09J 2433/00* (2013.01); *C09J 2467/005* (2013.01); *C09J 2467/006* (2013.01); *G09F 2003/0261* (2013.01)

(56) References Cited

U.S. PATENT DOCUMENTS

| | | | | |
|---|---|---|---|---|
| 3,329,550 A * | | 7/1967 | Kucheck | B65C 9/28 156/285 |
| 3,578,536 A * | | 5/1971 | Peck et al. | B44C 1/172 156/497 |
| 3,676,257 A * | | 7/1972 | Ingalls | B65C 9/1869 156/351 |
| 3,690,997 A * | | 9/1972 | Bofinger et al. | B31C 1/00 156/215 |
| 4,132,583 A * | | 1/1979 | Hodgson | B65C 9/1884 156/351 |
| 4,217,164 A * | | 8/1980 | La Mers | B65C 9/1884 156/495 |
| 4,242,167 A * | | 12/1980 | Hoffmann | B65C 9/08 118/261 |
| 4,267,004 A * | | 5/1981 | Anderson | B65C 9/1869 156/361 |
| 4,314,869 A * | | 2/1982 | Crankshaw | B65C 3/12 156/215 |
| 4,366,023 A * | | 12/1982 | Voltmer | B65C 9/1884 156/361 |
| 4,427,484 A * | | 1/1984 | Cameron, Jr. | B65C 3/14 156/361 |
| 4,454,180 A * | | 6/1984 | La Mers | B65C 9/1884 156/252 |
| 4,561,928 A * | | 12/1985 | Malthouse | B26D 1/385 156/497 |
| 4,585,506 A * | | 4/1986 | Matsuguchi | B65C 9/1869 156/361 |
| 4,610,753 A * | | 9/1986 | Voltmer | B31D 1/021 156/552 |
| 4,680,082 A * | | 7/1987 | Kearney | B65C 9/1876 156/497 |
| 4,867,833 A * | | 9/1989 | McCoy | B65C 9/42 156/361 |
| 4,978,415 A * | | 12/1990 | Jones | B65C 9/1819 156/256 |
| 5,061,334 A * | | 10/1991 | Paules | B65C 1/021 156/235 |
| 5,188,696 A * | | 2/1993 | Good, Jr. | B65C 3/16 156/361 |
| 5,232,540 A * | | 8/1993 | Southwell | B65C 1/021 156/361 |
| 5,256,239 A * | | 10/1993 | Voltmer | B65C 9/188 156/351 |
| 5,336,359 A * | | 8/1994 | Pituch | B65B 61/202 156/542 |
| 5,405,482 A * | | 4/1995 | Morrissette | B65C 9/188 156/362 |
| 5,486,253 A * | | 1/1996 | Otruba | B65C 9/14 156/215 |
| 5,540,795 A * | | 7/1996 | Franklin | B65C 1/021 156/350 |
| 5,587,043 A * | | 12/1996 | Hying | B65C 9/02 156/361 |
| 5,618,600 A | | 4/1997 | Denklau | |
| 5,718,525 A * | | 2/1998 | Bruhnke | B41J 3/4075 400/120.16 |
| 5,733,410 A * | | 3/1998 | Gore | B29C 63/02 156/542 |
| 5,902,449 A * | | 5/1999 | Moore | B65C 3/16 156/249 |
| 6,123,796 A * | | 9/2000 | Kathmann | B31D 1/021 156/152 |
| 6,143,105 A * | | 11/2000 | Nash | B65C 9/02 156/270 |
| 6,187,128 B1 * | | 2/2001 | Oosterlinck | B31D 1/021 156/152 |
| 6,206,071 B1 * | | 3/2001 | Majkrzak | B65C 9/1819 156/265 |
| 6,230,780 B1 * | | 5/2001 | Rietheimer | B65C 11/006 156/541 |
| 6,352,751 B1 * | | 3/2002 | Miles | B65C 9/1819 283/101 |
| 6,383,591 B1 * | | 5/2002 | Miles | B65C 9/1819 283/81 |
| 6,451,149 B1 * | | 9/2002 | McKenney | B65C 9/0006 156/202 |
| 6,726,796 B2 * | | 4/2004 | Wells | B65C 9/20 156/277 |
| 6,773,539 B2 * | | 8/2004 | Mertens | B65C 9/1819 156/256 |
| 6,794,099 B1 | | 9/2004 | Chen et al. | |
| 6,830,642 B2 * | | 12/2004 | Greenhill | B65C 9/188 156/230 |
| 6,884,312 B2 * | | 4/2005 | Mitchell | B41J 3/4075 156/256 |
| 6,910,820 B2 * | | 6/2005 | Baker | B41J 3/4075 156/384 |
| 7,229,517 B2 * | | 6/2007 | Bellafore | B65C 3/16 156/273.3 |
| 7,765,776 B1 * | | 8/2010 | Leu | B65B 5/045 53/131.4 |
| 7,892,383 B2 * | | 2/2011 | Broad | B65C 9/1873 101/474 |
| 7,935,199 B2 * | | 5/2011 | Mochida | B65C 9/1884 156/351 |
| 8,109,066 B2 * | | 2/2012 | Leu | B65B 5/045 53/131.3 |
| 8,262,828 B2 * | | 9/2012 | Grimes | B65C 9/1865 156/249 |
| 8,453,700 B2 * | | 6/2013 | Painter | B65C 1/025 156/541 |
| 8,573,276 B2 * | | 11/2013 | Wade | B65C 9/1896 156/521 |
| 8,616,259 B1 * | | 12/2013 | Woods | B65C 9/2221 156/390 |
| 8,776,857 B1 * | | 7/2014 | Jackson | B65C 9/00 156/230 |
| 8,882,955 B2 * | | 11/2014 | Brandon | B65C 3/00 156/261 |
| 8,927,100 B2 * | | 1/2015 | Kian | C09J 133/08 428/355 AC |
| 8,950,783 B2 * | | 2/2015 | Raming | B42D 15/006 283/60.1 |
| 8,974,615 B2 * | | 3/2015 | Dods | B65C 1/021 156/358 |
| 9,169,034 B2 * | | 10/2015 | Jackson | B65C 9/00 |
| 9,181,462 B2 * | | 11/2015 | Kian | C09J 133/08 |

(56) References Cited

U.S. PATENT DOCUMENTS

| | | | | |
|---|---|---|---|---|
| 9,200,186 B2* | 12/2015 | Kian | | B32B 37/06 |
| 9,561,877 B2* | 2/2017 | Woods | | B65C 9/2221 |
| 9,809,730 B2* | 11/2017 | Naik | | G09F 3/10 |
| 9,850,018 B2* | 12/2017 | McNestry | | B65C 9/1865 |
| 9,902,185 B2* | 2/2018 | Raming | | B42D 15/006 |
| 9,937,100 B1* | 4/2018 | Joplin | | B65C 3/08 |
| 9,944,423 B2* | 4/2018 | Zacche' | | B65C 9/1807 |
| 2002/0034602 A1* | 3/2002 | Mertens | | B65C 9/1819 |
| | | | | 428/40.1 |
| 2002/0088552 A1* | 7/2002 | Treadway | | B65C 9/1869 |
| | | | | 156/542 |
| 2002/0104623 A1* | 8/2002 | Merrill | | B65C 9/0006 |
| | | | | 156/767 |
| 2002/0117263 A1* | 8/2002 | McKenney | | B65C 9/0006 |
| | | | | 156/361 |
| 2002/0134500 A1* | 9/2002 | Wells | | B65C 9/20 |
| | | | | 156/277 |
| 2002/0189741 A1* | 12/2002 | Nielsen | | B65C 3/00 |
| | | | | 156/64 |
| 2003/0192639 A1* | 10/2003 | Mitchell | | B41J 3/4075 |
| | | | | 156/250 |
| 2004/0026024 A1* | 2/2004 | Nakasaka | | B65C 11/006 |
| | | | | 156/250 |
| 2004/0112520 A1* | 6/2004 | Hanschen | | B65C 9/1803 |
| | | | | 156/277 |
| 2004/0155050 A1* | 8/2004 | Fore | | B65C 9/10 |
| | | | | 221/31 |
| 2004/0159402 A1* | 8/2004 | Poole | | B65C 9/1865 |
| | | | | 156/384 |
| 2004/0177931 A1* | 9/2004 | Baumli | | B65C 7/00 |
| | | | | 156/539 |
| 2004/0180170 A1* | 9/2004 | Mertens | | B65C 9/1819 |
| | | | | 428/40.1 |
| 2004/0182505 A1* | 9/2004 | Greenhill | | B65C 9/188 |
| | | | | 156/230 |
| 2004/0200566 A1* | 10/2004 | Bellafore | | B65C 3/16 |
| | | | | 156/230 |
| 2004/0206461 A1* | 10/2004 | Poole | | B65C 9/1865 |
| | | | | 156/541 |
| 2005/0019081 A1* | 1/2005 | Baker | | B41J 3/4075 |
| | | | | 400/615.2 |
| 2005/0109443 A1* | 5/2005 | Sleiman | | B65C 3/00 |
| | | | | 156/64 |
| 2005/0115680 A1* | 6/2005 | Thoms | | B65C 9/1803 |
| | | | | 156/354 |
| 2006/0065371 A1* | 3/2006 | Grabowski | | B65C 1/047 |
| | | | | 156/538 |
| 2006/0096710 A1* | 5/2006 | Tsukamoto | | B31D 1/021 |
| | | | | 156/384 |
| 2006/0102291 A1* | 5/2006 | Hongo | | B65C 9/1869 |
| | | | | 156/542 |
| 2006/0237125 A1* | 10/2006 | Montgomery | | B65C 9/1876 |
| | | | | 156/249 |
| 2006/0249258 A1* | 11/2006 | Painter | | B65C 1/025 |
| | | | | 156/541 |
| 2007/0221319 A1* | 9/2007 | Morgan | | B65C 1/045 |
| | | | | 156/249 |
| 2008/0017303 A1* | 1/2008 | Crouch | | B65C 9/0006 |
| | | | | 156/249 |
| 2008/0017321 A1* | 1/2008 | Crouch | | B65C 9/0006 |
| | | | | 156/391 |
| 2008/0047660 A1* | 2/2008 | Angel | | B65C 9/1869 |
| | | | | 156/238 |
| 2008/0093020 A1* | 4/2008 | Ford | | B65C 9/1884 |
| | | | | 156/324 |
| 2008/0307686 A1* | 12/2008 | Wade | | B65C 9/1896 |
| | | | | 40/638 |
| 2009/0065151 A1* | 3/2009 | Mochida | | B65C 9/1884 |
| | | | | 156/388 |
| 2009/0081430 A1 | 3/2009 | Husemann et al. | | |
| 2009/0081452 A1 | 3/2009 | Husemann et al. | | |
| 2009/0090469 A1* | 4/2009 | Painter | | B65C 1/025 |
| | | | | 156/362 |
| 2009/0126850 A1* | 5/2009 | Fletcher | | B65C 3/16 |
| | | | | 156/60 |
| 2009/0159191 A1* | 6/2009 | Grimes | | B65C 9/1865 |
| | | | | 156/249 |
| 2010/0281829 A1* | 11/2010 | Leu | | B65B 5/045 |
| | | | | 53/415 |
| 2010/0288428 A1* | 11/2010 | Broad | | B65C 9/1873 |
| | | | | 156/238 |
| 2011/0030890 A1* | 2/2011 | Cumberland | | B65C 9/183 |
| | | | | 156/249 |
| 2011/0120642 A1* | 5/2011 | Broad | | B65C 9/1873 |
| | | | | 156/322 |
| 2011/0209831 A1* | 9/2011 | Sekimoto | | B65C 9/1865 |
| | | | | 156/361 |
| 2012/0118489 A1* | 5/2012 | Broad | | B65C 9/1873 |
| | | | | 156/184 |
| 2012/0216951 A1* | 8/2012 | Kian | | C09J 133/08 |
| | | | | 156/273.3 |
| 2013/0011629 A1* | 1/2013 | Brandon | | B65C 3/00 |
| | | | | 428/192 |
| 2013/0126100 A1* | 5/2013 | Fujita | | B65C 9/0006 |
| | | | | 156/719 |
| 2013/0245174 A1* | 9/2013 | Kian | | B32B 37/06 |
| | | | | 524/293 |
| 2013/0248103 A1* | 9/2013 | Kian | | C09J 133/08 |
| | | | | 156/273.3 |
| 2013/0340918 A1* | 12/2013 | Dods | | B65C 1/021 |
| | | | | 156/73.6 |
| 2014/0060752 A1* | 3/2014 | Li | | B65C 9/1865 |
| | | | | 156/767 |
| 2014/0117659 A1* | 5/2014 | Raming | | B42D 15/006 |
| | | | | 283/81 |
| 2014/0150976 A1* | 6/2014 | Woods | | B65C 9/2221 |
| | | | | 156/366 |
| 2014/0216629 A1* | 8/2014 | Jackson | | B65C 9/00 |
| | | | | 156/64 |
| 2014/0311664 A1* | 10/2014 | Jackson | | B65C 9/00 |
| | | | | 156/247 |
| 2014/0318700 A1* | 10/2014 | Henderson | | B65C 9/1865 |
| | | | | 156/249 |
| 2014/0338840 A1* | 11/2014 | Lux | | B65C 9/14 |
| | | | | 156/542 |
| 2015/0013914 A1* | 1/2015 | Zacche' | | B65C 9/1807 |
| | | | | 156/351 |
| 2015/0128466 A1* | 5/2015 | Raming | | B42D 15/006 |
| | | | | 40/638 |
| 2015/0266606 A1* | 9/2015 | Wiegers | | B32B 27/08 |
| | | | | 156/230 |
| 2015/0274347 A1* | 10/2015 | McNestry | | B65C 9/1865 |
| | | | | 156/361 |
| 2015/0291302 A1* | 10/2015 | McNestry | | B65C 9/1865 |
| | | | | 156/64 |
| 2016/0214360 A1* | 7/2016 | Snedecor | | B65C 9/0006 |
| 2016/0264281 A1* | 9/2016 | Watanabe | | B65C 9/18 |
| 2016/0332765 A1* | 11/2016 | Thompson | | A61J 1/06 |
| 2016/0362583 A1* | 12/2016 | Naik | | G09F 3/10 |
| 2018/0044049 A1* | 2/2018 | Vega | | B65C 3/14 |

FOREIGN PATENT DOCUMENTS

| | | |
|---|---|---|
| JP | 0699957 | 4/1994 |
| JP | 2005139226 | 6/2005 |
| WO | 0130933 | 5/2001 |
| WO | 2011093958 A8 | 8/2011 |
| WO | 2014112389 A1 | 7/2014 |

OTHER PUBLICATIONS

Martienssen et al., "Springer Handbook of Condensed Matter and Materials Data";2005, XVIII, p. 477-485.

(56) References Cited

OTHER PUBLICATIONS

U.S. Non-Final Office Action for U.S. Appl. No. 14/735,197, filed Jun. 10, 2015; dated Apr. 6, 2017; 24 pages.

* cited by examiner

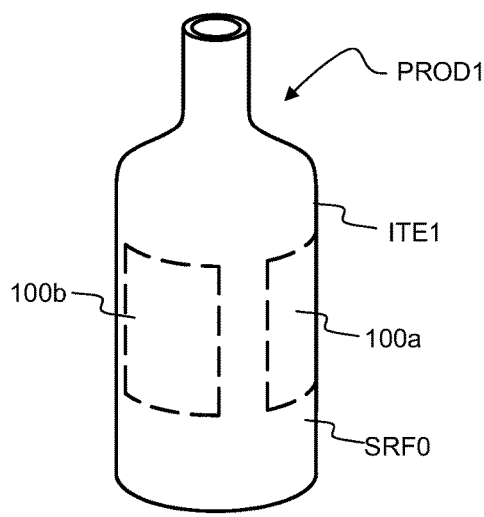
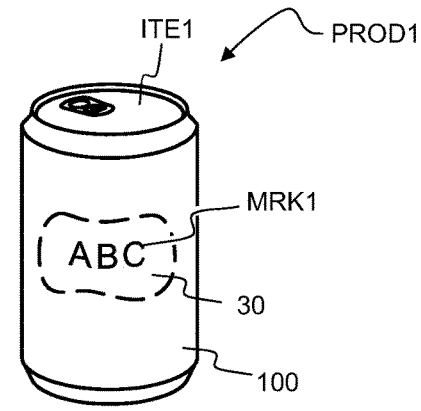
Fig. 3a    Fig. 3b
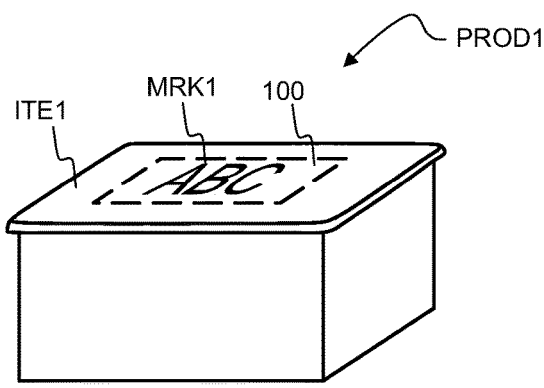
Fig. 3c

METHOD FOR LABELING ITEMS WITH LABELS COMPRISING A CLEAR FACE LAYER AND A CLEAR ADHESIVE LAYER

CROSS REFERENCE TO RELATED APPLICATIONS

This application is a divisional application of U.S. application Ser. No. 14/735,197, filed on Jun. 10, 2015, the entire contents of which is expressly incorporated herein by reference.

FIELD

Some versions relate to a method for labeling items.

BACKGROUND

It is known that a printed paper label may be attached to an item in order to provide printed information about the product. The label may be attached to an item by using a labeling apparatus. The labeling apparatus may be arranged to operate at a high rate. For example, the labeling apparatus may be arranged to attach labels to glass bottles at a rate, which is higher than 750 labels per minute. The labels may be provided e.g. as a wound roll, which may comprise e.g. thousands of labels.

SUMMARY

Some versions may relate to a method for attaching a label to an item. Some versions may relate to a labeled item.

According to an aspect, there is provided a method for labeling items, the method comprising:
separating a label from a release liner by using peel plate,
moving the surface of an item in a first direction,
moving the label in a second direction, and
bringing a leading edge of the label into contact with a surface of the item such that the angle between the first direction and the second direction is in the range of 10° to 30°,
wherein the label comprises:
a face layer, and
an adhesive layer,
wherein the face layer comprises semi-crystalline polymeric film, the adhesive layer consists of one or more adhesive sub-layers, a lowermost adhesive sub-layer of said adhesive sub-layers comprises transparent polymeric adhesive, the thickness of the face layer is in the range of 10 µm to 50 µm, the thickness of the adhesive layer is in the range of 8 µm to 25 µm, and the thickness of the adhesive layer is smaller than 95% of thickness of the face layer.

The life cycle of the above-mentioned label containing the semi-crystalline polymeric film may include e.g. manufacturing, storing, transportation, labeling, and recycling of waste material. By using the label, the total costs associated with the whole life cycle of the label may be reduced. Using the label may provide a cost-efficient way for improving the visual appearance of an item. Using the label may provide a cost-efficient way for altering the visual appearance of an item. Using the label may provide a cost-efficient way for adding a marking to an item. Using the label may provide a cost-efficient alternative for printing directly on the surface on an item. Using the label may allow less frequent change of rolls for a labeling apparatus, as a single roll may comprise an increased number of labels. Using the label may be facilitate transportation of a large amount of labels. Using the label may be facilitate storing a large amount of label. Producing the labelstock may consume materials. When using the label, the amount of raw materials needed for the production may be substantially reduced. Using the label may be environmentally friendly.

High Speed Labeling

Using the label may facilitate high speed labeling, wherein the rate of labeling may be e.g. higher than or equal to 750 labels per minute. For example, a labeling apparatus may be arranged to attach labels to more than 750 glass bottles per minute.

The polymeric face layer of the label may be oriented by uniaxial or biaxial stretching during manufacturing of the polymeric semi-crystalline film. The uniaxially or biaxially oriented face layer may be dimensionally stable. The dimensional stability may facilitate accurate positioning of the labels during high speed labeling.

When using the stretched polymeric material, the relative stiffness of the face layer may also increase with decreasing thickness of the face layer. The stiffness may be proportional to the second moment of area multiplied by the tensile modulus. The relative stiffness of the face layer may be proportional to the stiffness of the face layer divided by the thickness of the face layer. The stiffness of the label may facilitate dispensing. The stiffness of the label may facilitate separation of leading edge of the label from a release layer during the dispensing. The stiffness of the label may facilitate handling of the label when it is separated from the release layer. Thus, the uniaxially or biaxially oriented face layer may facilitate use of the labels for high speed labeling.

Visual Appearance

The label may comprise a transparent portion. For example, more than 20% of the (one-sided) area of the label may be transparent, and the remaining area of the label may comprise one or more printed markings. The original surface of an item may be observed visually through the label, after the label has been attached to said original surface. The original surface may form a visual background for the markings of the label. The original surface may highlight the markings of the label. Using the markings together with the background may improve the visual appearance of the labeled item. The markings may be associated with a trade mark and/or brand. Combining the markings of the label with the original surface of the item may emphasize the visual appearance of the brand. A potential customer may simultaneously see the marking and the texture of the original surface of the item through the clear portion of the label. Combining the marking of the label with the original surface of the item may emphasize the association formed between the marking and the item.

The dimensionally stable face layer may allow precision printing and accurate positioning of the label with respect to the labelled item. The dimensionally stable face layer may allow accurate positioning of the marking with respect to the label. The dimensionally stable face layer may allow accurate positioning of the label with respect to the item. The dimensionally stable face layer may allow accurate positioning of the marking of the label with respect to the item.

The label may comprise two or more layers, wherein each layer may have a different function. Each layer may have its own optical properties. The visual appearance of the label may depend on the optical characteristics of the layers of the label. In particular, the visual detectability of the label may depend on the optical characteristics of the layers of the label.

The optical properties of the label may be tailored by selecting the optical properties of the structural layers of the label. The optical properties of the label may depend on the optical properties of the structural layers in the visible spectrum of light. The visible spectrum may refer to the wavelength range from 380 nm to 760 nm.

The refractive index of the face layer may be increased by using uniaxially or biaxially oriented polymeric semi-crystalline film. Consequently, the upper surface of the face layer may provide more intense optical reflections. In particular, the label may provide a high gloss effect.

The label may provide a "no-label look", i.e. the label and the background may be combined such that the color and the texture of the background is visible through the transparent portion of the label.

The transparent portion of the label may allow substantial freedom to select the shape and position of the marking with respect to the background. Using the label may provide a cost-effective solution e.g. when compared with a printed marking, which would be directly printed on the surface of the item.

The shape of the perimeter of a printed region of the label may be substantially different from the shape of the perimeter of the label. For example, the label may be substantially rectangular, wherein the printed region may be e.g. circular, oval, triangular, diagonal and/or slanted. For example, the label may be substantially oval or circular, wherein the printed region may be substantially rectangular. The printed region of the label may comprise e.g. a square, circular or irregular graphical pattern surrounded by a clear portion of the label.

The small thickness of the label may improve the transparency of the label. The small thickness may reduce absorption and scattering in the face layer and in the adhesive layer. The small thickness of the label may make the edges of the label less discernible, by reducing scattering of light from the edges when the label has been attached on the surface of the item.

In an embodiment, the total thickness of the label may be so small that the edge of the label is less discernible when viewed by bare eyes. For example, the total thickness of the label may be smaller than 38 μm (1.5 mils), or even smaller than 25 μm (1.0 mils).

The label may merge visually into the background provided by the surface of the item. The properties of the label may be selected such that it may be rather difficult to visually detect the clear portions of the label when the label has been attached on the surface of the item.

Smoothing Effect

The clear portion of the label may have a capability to hide visually detectable irregularities and/or scratches of the surface of the item. Attaching the label to the item may improve the visual appearance of the item. For example, the adhesive layer may fill imperfections of the surface of the item, wherein the high refractive index of the adhesive layer may reduce optical scattering from the irregularities and/or scratches of the surface of the item.

The face layer and the adhesive layer may be easily bent to conform to cylindrically curved surfaces, e.g. to the surface of a typical glass bottle. The label may conform to the principal radius of curvature of the surface of the item. Consequently, the edges of the label may remain substantially unnoticeable. The thin label may cover the surface of the item so that the edges of the label protrude very little from the surface of the item. The low elevation of the edges of the label and the high dimensional stability of the face layer may reduce the risk of damaging the label during handling of a labeled item.

Controlling the Size of Air Bubbles

Using the thin labels in high speed labeling may sometimes cause trapping of air bubbles between the labels and the items. The air bubbles may be caused e.g. by a high-speed release behavior of the adhesive layer, when the adhesive label is separated from the liner during the labelling process. Rapid separation of the adhesive layer from the release layer during high speed labeling may temporarily increase the roughness of the exposed adhesive layer. The time delay between peeling and contact with the item may be so short that air may be carried to the interface by the irregularities of the exposed adhesive layer. When the adhesive layer is peeled away from the release layer at high speed, the exposed surface of the adhesive layer may remain slightly irregular so that the adhesive layer does not have time to smoothen before being attached on the substrate surface. Consequently, one or more air bubbles may be formed due to air trapped between the label and the substrate surface.

The adhesive of the label may cover the surface of the item by wetting. The wetting may ensure that the label is firmly attached to the surface of the item. The wetting may also (slowly) move air beneath the label so that microscopic air bubbles coalesce to form visually detectable larger air bubbles. The wetting may be arranged to eliminate gas bubbles, by causing overpressure and diffusion of the gas away from the bubbles. Temporal behavior of air bubbles may be controlled by selecting the materials and the dimensions of the label. The materials and the dimensions of the label may be selected such that small air bubbles trapped between the label and the item may substantially disappear e.g. within 24 hours.

An air cushion may be formed due to the rapid movement of the label so that air is entrained to the space beneath the label. The labeling speed may be so high that the air does not have time to escape from the gap between the label and the item. The dispensing geometry may be selected to minimize the effect of the air cushion. The dimensional stability of the label may be utilized when reducing the amount of air trapped between the label and an item. The dimensional stability of the label may substantially prevent formation of large air bubbles during the dispensing, when using a suitable dispensing geometry. Formation of air bubbles may be controlled by selecting the dispensing parameters.

BRIEF DESCRIPTION OF THE DRAWINGS

In the following examples, several variations will be described in more detail with reference to the appended drawings, in which FIG. 3a shows, by way of example, in a three dimensional view, a labeled transparent item, FIG. 3b shows, by way of example, in a three dimensional view, a labeled metallic item, FIG. 3c shows, by way of example, in a three dimensional view, a labeled item, which has a flat labeled portion.

All drawings are schematic.

DETAILED DESCRIPTION

Adhesive Label

Figure 1A:
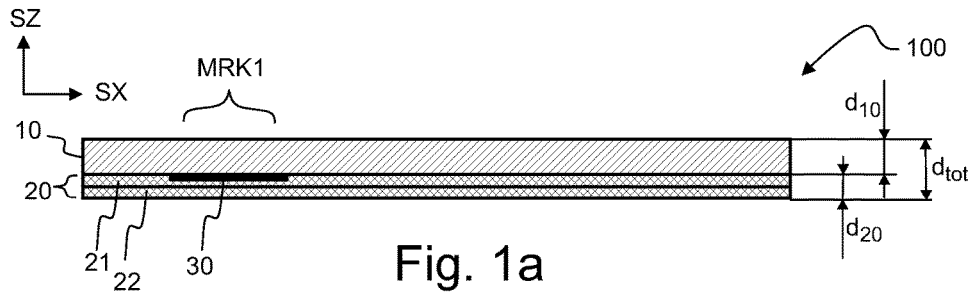
FIG. 1a shows, by way of example, in a cross-sectional view, a label, which comprises a face layer, an adhesive layer consisting of two adhesive sublayers, and a printed region between the face layer and the adhesive layer.
Figure 1B:
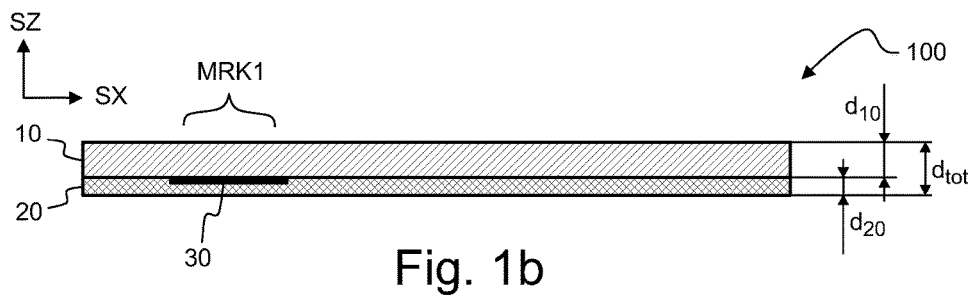
FIG. 1b shows, by way of example, in a cross-sectional view, a label, which comprises a face layer, and an adhesive layer consisting of one adhesive sublayer, and a printed region between the face layer and the adhesive layer.
Figure 1C:
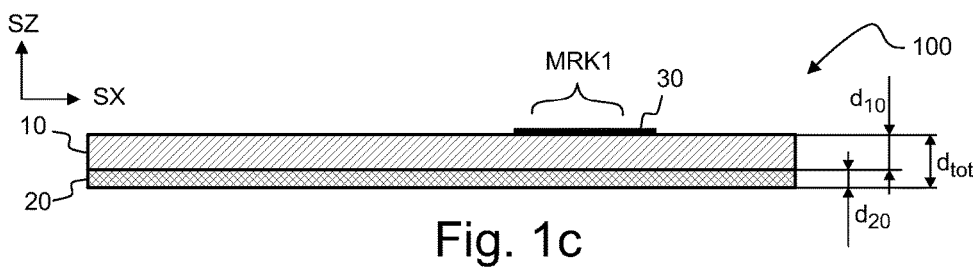
FIG. 1c shows, by way of example, in a cross-sectional view, a label, which comprises a face layer and an adhesive layer, wherein a printed region has been formed on the upper surface of the face layer.

Referring to FIGS. 1a, 1b and 1c, the adhesive label 100 may comprise a face layer 10, and an adhesive layer 20. The adhesive label 100 may optionally comprise a printed region 30. The printed region 30 may be located between the face layer 10 and the adhesive layer 20 (FIGS. 1a and 1b). The face layer 10 may mechanically protect the printed region 30.

The printed region 30 may be implemented on top of the face layer 10 (FIG. 1c). The printed region 30 may comprise a marking MRK1. The marking MRK1 may comprise e.g. alphanumerical symbols and/or graphics.

Figure 2A:
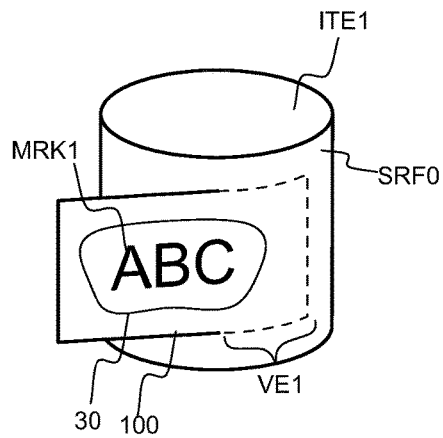
FIG. 2a shows, by way of example, in a three dimensional view, attaching a label to an item.

Referring to FIG. 1a, the adhesive layer 20 may comprise one or more adhesive sub-layers 21, 22. The adhesive layer 20 may consist of one or more adhesive sub-layers 21, 22. The adhesive layer 20 may adhere to the surface SRF0 of an item ITE1 (FIG. 2a). The adhesive layer 20 may form an adhesive bond between the face layer 10 and the surface SRF0 of the item ITE1. The uppermost sub-layer 21 may be in contact with the face layer 10, and the lowermost sub-layer 22 may be in contact with the item. At least a portion of the uppermost sub-layer 21 may be in contact with the face layer 10. The label 100 may comprise a printed region 30 implemented between the face layer 10 and the adhesive layer 20 such that at least a portion of the uppermost sub-layer 21 is in contact with the face layer 10. The lowermost sub-layer 22 may adhere to the surface of an item. The chemical composition of the uppermost sub-layer 21 may be different from the chemical composition of the lowermost sub-layer 22. The composition of the sub-layers 21, 22 may be tailored to optimize the optical and mechanical properties of the label, and/or in order to reduce material costs. For example, the chemical composition of the lowermost sub-layer 22 may be selected to maximize adhesion. For example, the chemical composition of the uppermost sub-layer 21 may be selected to minimize optical reflectivity of the interface between the uppermost sub-layer 21 and the face layer 10. For example, the chemical composition of the lowermost sub-layer 22 may be selected to minimize optical reflectivity the interface between the lowermost sub-layer 22 and the item.

Referring to FIG. 1b, the adhesive layer 20 may consist of only one sub-layer, wherein the uppermost sub-layer may also be act as the lowermost sub-layer.

The label 100 may comprise a substantially clear portion. The clear portion may be called as substantially transparent portion. The face layer 10 may comprise or consist essentially of suitable clear, semicrystalline polymeric film, in order to provide the clear portion. The face layer 10 may comprise semi-crystalline polymeric film. The semi-crystalline polymeric film may be e.g. a polyester film. The polyester film may be e.g. polyethylene terephthalate (PET). The polyester film may be e.g. polyethylene naphthalate (PEN).

The adhesive layer 20 may comprise transparent polymeric adhesive. The adhesive layer 20 may comprise acrylic polymeric adhesive. The polymeric adhesive may also be e.g. a non-water whitening polymeric adhesive The thickness $d_{10}$ of the face layer 10 may be e.g. in the range of 10 μm to 50 μm, and the thickness $d_{20}$ of the adhesive layer 20 may be e.g. in the range of 8 μm to 25 μm. The thickness $d_{20}$ of the adhesive layer 20 may be smaller than 95% of the thickness $d_{10}$ of the face layer 10.

The thickness of $d_{10}$ of the face layer 10 may be e.g. substantially equal to 18 μm. The thickness of $d_{10}$ of the face layer 10 may be e.g. substantially equal to 19 μm. The thickness of $d_{10}$ of the face layer 10 may be e.g. substantially equal to 23 μm.

The thickness $d_{20}$ of the adhesive layer may be selected according to the thickness of the face layer. The thickness $d_{20}$ of the adhesive layer 20 may be e.g. in the range of 50% to 95% of the thickness $d_{10}$ of the face layer 10.

When the thickness $d_{10}$ of the face layer 10 is in the range of 12 μm to 25 μm, the thickness $d_{20}$ of the adhesive layer 20 may be e.g. in the range of 8 μm to 24 μm.

The refractive index $n_2$ of the uppermost adhesive sub-layer 20 may be e.g. in the range of 80% to 98.5% of the refractive index $n_1$ of the semi-crystalline polymeric film. The refractive index $n_2$ of the uppermost adhesive sub-layer 20 may be e.g. in the range of 80% to 98.5% of the refractive index $n_1$ of the semi-crystalline polymeric film at the wavelength of 550 nm. Consequently, the reflection coefficient $R_2$ of the optical interface between the face layer 10 and the adhesive layer 20 may be kept below a predetermined value. The refractive index $n_1$ and $n_2$ may be determined e.g. at the wavelength of 550 nm. The wavelength of 550 nm may be considered to represent green light.

Figure 6A:
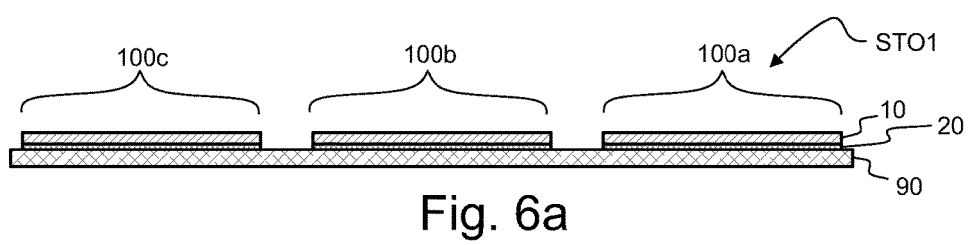
FIG. 6a shows, by way of example, in a cross-sectional view, a labelstock, which comprises a plurality of labels carried by a common release layer.

The label 100 may be provided such that the label 100 is carried by a release liner 90 (FIG. 6a). The adhesive layer 20 may be located between the face layer 10 and the release liner 90. The release liner 90 may comprise e.g. polyester or paper. The release liner 90 may comprise a non-blocking surface layer 91 (FIG. 9b). The surface layer 91 may comprise e.g. silicone polymer. The label 100 may be attached to a release liner 90 comprising a non-blocking surface layer 91, such that the adhesive layer 20 is between the face layer 10 and the non-blocking surface layer 91 of the release liner 90.

The uppermost layer of the label 100 may consist of polyester film, or the face layer 10 of the label 100 may be optionally coated with a release coating. The release coating may e.g. facilitate keeping the label clean after it has been attached to an item.

The combination of a plurality of labels and the release layer carrying the labels may be called as a labelstock STO1 (FIG. 6a). The release layer may support a plurality of labels. The labelstock STO1 may comprise a plurality of labels attached to the release layer 90.

The total thickness $d_{tot}$ of the label 100 may be e.g. in the range of 150% to 195% of the thickness $d_{10}$ of the face layer 10, when the label 100 is not attached to the release layer. The total thickness $d_{tot}$ of the label 100 may mean the thickness from the uppermost surface of the face layer 10 to the lowermost surface of the lowermost adhesive sub-layer.

Figure 10A:
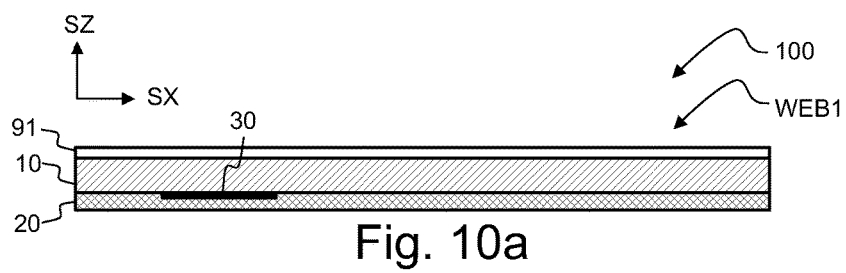
FIG. 10a shows, by way of example, in a cross-sectional view, a label comprising a release coating on the uppermost surface.
Figure 10B:
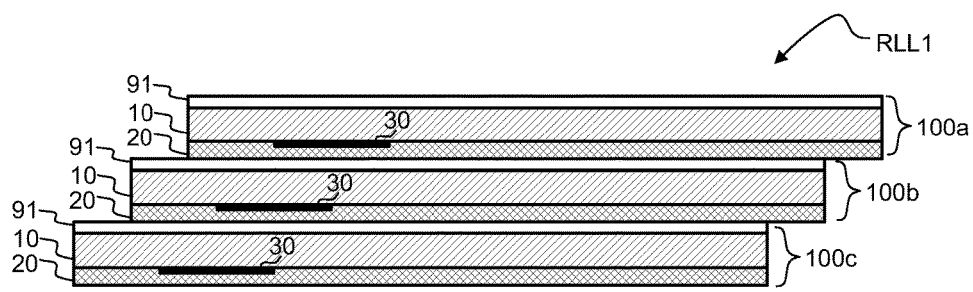
FIG. 10b shows, by way of example, in a cross-sectional view, a plurality of stacked linerless labels.

The label 100 may also be provided as a linerless label (FIG. 10a). A plurality of linerless labels may be supplied as a roll (FIG. 10d). When the label is supplied as a linerless label, the uppermost surface of the label 100 may be coated with a release coating in order to avoid blocking of the roll.

Face Layer

The face layer 10 of the label 100 may provide e.g. one or more of the following functions:

the face layer 10 may carry one or more printed regions 30, the face layer 10 may protect the one or more printed regions 30, the face layer 10 may provide transparency, the face layer 10 may provide a no-label look the face layer 10 may provide a vanishing edge VE1, the face layer 10 may provide low visual contrast when compared with an exposed (non-labelled) portion of the labeled item, the face layer 10 may provide a highly reflective upper surface, the face layer 10 may provide a lower surface, which has a low optical reflectivity, the face layer 10 may provide sufficient stiffness for high speed dispensing of the label 100, the stiff and thin face layer may facilitate controlling the dispensing geometry, the face layer may provide longitudinal tension for controlling dispensing geometry, the face layer may allow diffusion of air away from air bubbles trapped beneath the label, the face layer 10 may smooth out irregularities of the item by conforming to the curved shape of an item, the face layer 10 may carry other labels in linerless applications.

Material of the Face Layer

The face layer 10 may comprise thermoplastic polymer. Preferably, the face layer 10 is semi-crystalline polymer, such as polyester. Polyesters such as polyethylene terephthalate and polyethylene naphtalate can be in semicrystalline form. The face layer 10 may be of polyethylene terephthalate or polyethylene naphtalate. Polyethylene terephthalate of the layer 10 may have an a density in the range of 1.35 to 1.45 g/cm$^3$, preferably close to 1.4 g/cm$^3$. The density may be determined according to ASTM D-1505.

The optical characteristics of the filmic polyester material may depend on the crystallinity of the polymer, on the alignment of the molecular chains, and on the thickness of the filmic polyester material. The crystallinity of the polymer and the alignment of the molecular chains may be controlled by the manufacturing method of the polyester material. Polyesters such as polyethylene terephthalate or polyethylene naphtalate may have a crystal size distribution. Depending on the crystal size distribution, the polymer material may be arranged to appear transparent, opaque or white. The semi-crystalline polymer material may comprise ordered regions where the polymer chains are both aligned and folded. Said ordered regions may be called e.g. as crystallites, crystals or grains. The crystallites may act as scattering centers for light. The characteristic size of the crystallites may be e.g. smaller than 400 nm, in order to provide a substantially transparent material.

Optical Absorption

The face layer 10 may be relatively thin. The thickness $d_{10}$ of the face layer may be e.g. smaller than or equal to 25 μm, smaller than or equal to 20 μm, or even smaller than or equal to 15 μm. The thickness $d_{10}$ of the face layer may be e.g. in the range of 10 μm to 25 μm. The thin layers 10, 20 may reduce the length of the optical path of light when said light travels through the label 100. The short length of the optical path may reduce the attenuation of the light travelling through the label 100. Consequently, the label 100 may appear to be clear even in a situation where the face layer 10 and/or the adhesive layer 20 would contain slightly light-absorbing material. The label 100 may appear to be clear even in a situation where the face layer 10 and/or the adhesive layer 20 contain impurities. This may reduce material costs.

Optical Scattering by the Face Layer (Haze Level)

Optical scattering by the face layer 10 may be determined from a label or a label layer as a haze value e.g. according to standard ASTM D-1003. The face layer 10 may have a low haze level. The face layer may be filmic polyester having a haze value equal to or less than 6.5%, advantageously equal to or less than 4.0%, and preferably equal to or less than 3.6%. The haze value of the face layer 10 may be e.g. in the range of 1.0% to 3.6%. The face layer 10 may also comprise "ultra" clear polyester film, wherein the haze value of the face layer 10 may be in the range of 0.5% to 1.0%. The face layer 10 may be filmic polyester having a thickness in the range of 12 μm to 23 μm (0.48 mil to 0.92 mil) wherein the haze value of the face layer 10 may be in the range of 0.5% to 3.6%.

Stiffness

The stiffness of the label 100 may be mainly determined by the stiffness of the face layer 10. The stiffness of the face layer 10 may be equal to the second moment of area multiplied by the tensile modulus. The relative stiffness of the face layer 10 may be equal to the stiffness of the face layer 10 divided by the thickness $d_{10}$ of the face layer 10. The face layer 10 may be uniaxially or biaxially oriented to provide a sufficient stiffness for the label 100 such that the label 100 may be dispensed at high-speed on a moving item ITE1.

The face layer 10 has a first tensile modulus in the machine direction (MD) and a second tensile modulus (CD) in the cross direction. The face layer may be filmic polyester having a tensile modulus, which is e.g. higher than 2700 MPa. The face layer may be filmic polyester having a tensile modulus, which is higher than 4000 MPa. The face layer may be filmic polyester having a tensile modulus, which is higher than 4150 MPa.

When the polyester film is bi-axially oriented, the tensile modulus of the polyester film may be substantially similar in both machine direction and cross direction. The face layer 10 may be made of a PET film, wherein the tensile modulus of the PET film may be e.g. than higher than 4000 MPa in the machine direction (MD), and/or the tensile modulus of the PET film may be higher than 4000 MPa in the cross direction (CD). The face layer 10 may be made of a PET film, wherein the tensile modulus of the PET film may be e.g. than higher than or equal to 4150 MPa in the machine direction (MD), and/or the tensile modulus of the PET film may be higher than or equal to 4150 MPa in the cross direction (CD). The tensile modulus may be determined according to standard ASTM D 882.

The stiffness of the label may be selected to be in a predetermined range so that the thin face layer may still be able to conform to the shape of the item. When attached to the item, the face material may bend and conforms to a principal radius of curvature of the substrate surface.

Hardness of the Face Layer

The hardness of the face layer 10 may be increased e.g. by uniaxial or biaxial stretching so as to reduce ghosting of the label when the label is supplied as a part of a wound roll. The term "ghosting" may mean a visible deformation made by the edge of a second label on the surface of a first label when the edge of said second label is pressed against the surface of the first label. The hardness of the face layer 10 may be e.g. higher than 94 in the Rockwell M scale.

Adhesive Layer

The adhesive layer 20 of the label 100 may have e.g. one or more of the following functions:

the adhesive layer 20 may adhere to the surface of an item,
the adhesive layer 20 may provide transparency,
the adhesive layer 20 may reduce the reflection coefficient of the interface between the face layer 10 and the adhesive layer 20,
the adhesive layer 20 may fill and hide optical defects of the surface of the item,
the adhesive layer 20 may allow separation of the label from a release liner,
the adhesive layer 20 may at least partly control longitudinal tension of the label during dispensing,
the adhesive layer 20 may reduce the size of gas bubbles by wetting, The label 100 comprises an adhesive layer 20 of polymeric material. The adhesive layer 20 may be arranged to attach the label on a substrate surface SRF0. Composition of the adhesive layer in this context refers to an adhesive substance, such as a polymeric compound, which has a tendency to adhere to the surface of an item by means of chemical adhesion and/or by means of dispersive adhesion. The adhesive substance of the layer 20 may adhere to the surface of an item by means of covalent bonds and/or by intermolecular attraction.

The adhesive layer composition may further be arranged to promote the optical characteristics of the label, such as clarity and "no-label look".

The adhesive layer may be configured to be self-adhesive, such that the label may be attached on the intended substrate surface material by pressing. The adhesive layer may comprise pressure sensitive adhesive (PSA). The adhesive layer may comprise pressure sensitive acrylic polymer adhesive.

The adhesive layer may comprise or consist essentially of polymeric adhesive. The adhesive layer may comprise or consist essentially of a polymeric adhesive suitable for clear label applications.

The polymeric adhesive of the layer 20 may be substantially transparent so that the adhesive layer of the label may contribute to the "no-label look". The refractive index of the polymeric adhesive may be selected to reduce reflectivity of the interface between the adhesive layer 20 and the face layer 10. The refractive index of the polymeric adhesive may be selected to reduce reflectivity of the interface between the adhesive layer 20 and the item ITE1.

Tack Value

The adhesive may be a pressure sensitive adhesive. The adhesive of the layer 20 may have a sufficient tack value so that the label is not peeled away from a labeled item during normal use of the labeled item. The adhesive of the layer 20 may have a sufficient tack value so that the label may withstand temperature fluctuations and humidity.

The tack value of the polymeric adhesive may be e.g. higher than or equal to 9N, such that the label may be firmly attached to the surface of the item.

The polymeric adhesive of the label may be arranged to have a release value higher than 15 g, preferably equal to or higher than 19 g, such as in the range of 19 to 23 g, as measured in a TLI release tester according to a modified FINAT test method, wherein a test tape is pulled at an angle of 180 degrees at a velocity of 1200 inches per minute, wherein the width of the test tape is equal to 2 inch, and the adhesive layer of the test tape consists of said polymeric adhesive.

The loop tack value of the polymeric adhesive may be equal to or higher than 0.4 kN/m. The loop tack value may be measured according to the method "LIB" as specified by the TLMI standardizing organization. TLMI means the Tag and Labels Manufacturing Institute, USA.

Wetting

The adhesive layer have an ability of eliminate small irregularities such as scratches from the substrate surface. A well-wetting adhesive may have an ability to spontaneously spread on a surface when the adhesive has been brought into contact with said surface. Wettability may define the capability of the polymeric adhesive to spread on a solid surface upon contact to the surface. The wetting properties of the polymeric adhesive may be selected such that when applied on a substrate surface having surface roughness, the polymeric adhesive may flow to the lower parts or valleys of the substrate surface. The adhesive material of the label may fill the lower parts or valleys of an irregular surface of the item.

The wetting properties of the polymeric adhesive applied on the surface of a material may be described by a contact angle ($\theta_c$) of the polymeric adhesive. The contact angle ($\theta_c$) may depend on the composition of the polymeric adhesive and on the composition of the material. When applied on a solid substrate surface, the polymeric adhesive has a tendency to spread until the internal forces of the adhesive, the gravity forces and the surface tension forces are in balance, such that an equilibrium state is reached. The advancing contact angle ($\theta_c$) for wetting a polyethylene terephthalate surface with the polymeric adhesive may be e.g. lower than 70° when determined at the temperature of 25° C. In case of spontaneous wetting, the advancing contact angle ($\theta_c$) for wetting a polyethylene terephthalate surface with the polymeric adhesive may be e.g. lower than 70° when determined at the temperature of 25° C. The contact angle may be different when the adhesive layer 20 is compressed between the face layer 10 and the surface SRF0 of the item ITE1.

The adhesive layer may have a low surface energy level, so as to improve the wettability of the surface SRF0 of the item ITE1. The surface tension of the polymeric adhesive may be e.g. lower than or equal to 40 dyn/cm when determined at the temperature of 25° C. The adhesive having a surface tension lower than or equal to 40 dyn/cm may be suitable for forming an adhesive bond with e.g. polyethylene terephthalate, glass, and/or aluminium.

Bleeding

When the labelstock is wound to form a roll, the pressure of the roll may cause the adhesive to bleed at the edges of the label. When dispensing the labels, the bleeding may cause accumulation of adhesive at different parts of the dispensing unit. The accumulation of adhesive may disturb operation of the labeling apparatus.

The low thickness of the adhesive layer 20 may reduce the risk of bleeding. The adhesive layer 20 may have a low coat weight. The coat weight of the adhesive may be e.g. in the range of 5 to 15 g/m².

Release Liner

The adhesive label 100 may be carried on a release liner 90. The release liner 90 comprising a release layer 91 may provide a platform for high speed dispensing of the label 100. For example, the release layer 91 may comprise or consists essentially of a silicone polymer. The release layer 91 may have low friction, low dusting and/or anti-adhesive properties such that the adhesive label 100 may be detached from the liner 90.

The release liner 90 may comprise e.g. polyester or paper. The release liner 90 may be made of clear polyester film having properties equal to the face layer described above. Advantageously, the release liner 90 may comprise or consist essentially of polyester, such as polyethylene terephthalate. The mechanical properties of the release liner 90 may be substantially similar to the mechanical properties of the face layer.

The coat weight of the release layer 91 applied on the release layer 90 may be e.g. equal to or smaller than 0.2 g/m². The coat weight of the release layer 91 applied on the release layer 90 may be e.g. substantially equal to 0.1 g/m².

Release Properties

A plurality of labels may be carried on a release liner 90. A first label 100, 100a may be separated from the release liner 90 before the first label 100, 100a is attached to an item IE1, ITE1a. The adhesive of the layer 20 and the release liner 90 may be selected such that the force needed to separate the label from the liner is higher than a threshold limit. The force may be used e.g. to control the longitudinal tension of the label during the dispensing. The force may be used e.g. to control the dispensing geometry. The release value of the label may be e.g. higher than 0.15 N (15 g) in a situation where a sample piece of the label is separated from the release liner 90 at an angle of 180° at a velocity of 1200 inches per minute at a temperature of 25° C., wherein the width of said sample piece is equal to 2 inches.

The 180° Peel Adhesion value of the polymeric adhesive may be equal to or higher than 3.2 pounds/inch, when measured after a 15 minutes dwell time. Advantageously, the 180° Peel Adhesion value of the polymeric adhesive may be equal to or higher than 4.0 pounds/inch, when measured after a 24 hour dwell time. The 180° Peel Adhesion may be measured by peeling a test tape from AISI 304 stainless steel surface according to the standard PSTC-1 for Peel Adhesion by the Pressure Sensitive Tape Council. The test tape may comprise a dry film of adhesive cast directly onto a polyester film, wherein the thickness of the adhesive film may be 25 μm and the thickness of the polyester film may be 50 μm.

A plurality of labels may also be provided as linerless labels, i.e. without a liner. The linerless labels may be wound to form a roll RLL1 (FIG. 10d). The labels 100a, 100b may form a linerless labelstock STO1. The labelstock STO1 may be provided as a wound roll RLL1. A first label 100, 100a of the roll RLL1 may be separated from second label of said roll RLL1 before the first label 100, 100a is attached to an item IE1, ITE1a. When the linerless labelstock STO1 is unwound from the roll RLL1, the adhesive layer 20 may be configured to separate from the wound roll RLL1 without damaging the other labels of the roll RLL1. To prevent the adhesive layer 20 from damaging other labels on the roll RLL1, the uppermost surface SRF1 of the label 100 may comprise a release coating 91, e.g. silicone polymer applied on top of the face layer 10.

Labeled Products

Figure 2B:
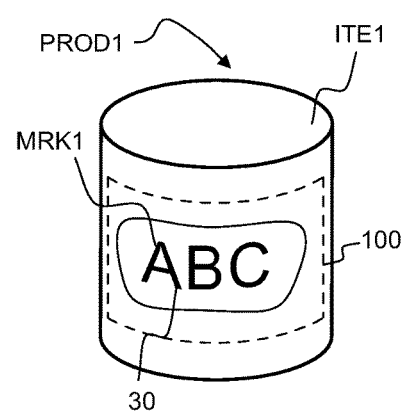
FIG. 2b shows, by way of example, in a three dimensional view, a labeled item.

Referring to FIGS. 2a and 2b, the label 100 may be attached to an item ITE1 to form a labeled item PROD1. The reflective properties of the label 100 may substantially match with the reflective properties of the item ITE1. Thus, the edge VE1 of the label 100 may be less easy detect visually. In this sense, the label attached to the item may have a "vanishing edge" VE1. The label 100 of the labeled item PROD1 may have a "vanishing edge" VE1.

Referring to FIG. 3a, the item ITE1 may comprise e.g. transparent glass or plastic. The item ITE1 may be e.g. a container for a beverage. The item ITE1 may be e.g. a glass bottle or a plastic bottle. The item ITE1 may be e.g. a transparent container made of glass. The item ITE1 may be e.g. a transparent container made of PET. The refractive index of the adhesive layer may substantially match with the refractive index of items made of glass or PET.

The label 100 may be used e.g. for labeling a bottle, which contain beverage. The label 100 may be used e.g. for labeling bottles, which contain beverage.

In particular, the label 100 may be used for labeling recycled glass containers, e.g. glass bottles. A recycled glass bottle may have a scratched surface SRF0, and the label 100 may improve the visual appearance of the scratched surface SRF0.

The label 100 may be used e.g. for labeling a container, which contain a household chemical.

Referring to FIG. 3b, the label 100 may also be attached e.g. to a lacquered metallic surface. The label 100 may be attached e.g. to a lacquered aluminum can. The label 100 may hide scratches or irregularities of the metallic surface. The high gloss of the label 100 may even further improve the visual appearance of the reflective surface of the metallic surface.

Referring to FIG. 3c, the label 100 may be applied on a substantially planar surface.

Optical Properties

The label 100 may comprise a clear portion. The label 100 may comprise a clear portion to transmit illuminating light LB1 through the uppermost surface SRF1 to the interface SRF3 between the adhesive layer 20 and the item ITE1.

The face layer 10 of the label 100 may comprise a clear portion. The clear portion of the face layer 10 may transmit illuminating light LB1 through the uppermost surface SRF1 to a printed region 30 between the face layer 10 and the adhesive layer 20, and to transmit reflected light back from the printed region 30 through the uppermost surface SRF1 to a viewer.

"No Label—Look"

The reflective properties of the label may substantially match with the reflective properties of the item. Thus, the edge VE1 of the label 100 may be less easy detect visually, see e.g. FIGS. 2a and 2b. In this sense, the label attached to the item may have a "vanishing edge" VE1.

The relative difference between the reflection coefficient of the uppermost surface of the label and the reflection coefficient of the exposed surface of the item may be e.g. smaller than 20%. The surface SRF0 of the item ITE1 may have a first reflection coefficient $R_c$, a labeled portion of the labeled item PROD1 may have a second reflection coefficient $R_{tot}$, and the relative difference $((R_c-R_{tot})/R_c)$ between the first reflection coefficient and the second reflection coefficient may be e.g. smaller than 20%. Consequently, the visual contrast at the edge of the label may be less easy to detect. The edge VE1 of the label may be less easy to detect visually.

Thanks to the thin adhesive layer, the printed region 30 and/or marking MRK1 may be close to the surface of the item. Consequently, the printed region 30 may look visually similar to a (comparative) region which would have been printed on the surface of the item. The printed region 30 may look visually indistinguishable from a region printed on the surface of a similar reference item.

The reflection coefficient of the interface between the adhesive layer and the face layer may be low. The uppermost surface of the label may reflect light more efficiently than the lower surfaces of the label, so as to provide a visually sharp reflection. The interface SRF2 between the face layer 10 and the adhesive layer 20 may have a reflection coefficient $R_2$, the uppermost layer SRF1 of the label 100 may have a reflection coefficient $R_1$, and the reflection coefficient $R_2$ of the interface SRF2 may be smaller than e.g. 10% of the reflection coefficient $R_1$ of the uppermost layer SRF1. The refractive index $n_2$ of the polymeric adhesive of the layer 20 may be close to the refractive index $n_1$ of the face layer. The refractive index $n_2$ of the polymeric adhesive may be e.g. in the range of 80% to 98.5% of the refractive index $n_1$ of the polyester film at the wavelength of 550 nm.

In particular, the refractive index $n_2$ of the polymeric adhesive may be in the range of 90% to 98.5% of the refractive index $n_1$ of the polyester film at the wavelength of 550 nm.

High Gloss

The label may provide a high gloss surface, which may substantially match e.g. with the high gloss of a glass or aluminum surface. The labeled portion of a labeled item may even have a higher gloss and/or smoother upper surface than the bare surface of the item. The label may substantially improve the surface quality of the item.

The reflection coefficient and the gloss of the uppermost surface of the label may depend on the difference between the refractive index of the face layer and the refractive index of air. The refractive index of the face layer may be increased by stretching the face layer, in order to provide a higher gloss. The face layer may be bi-axially stretched. The refractive index $n_1$ of the stretched polyester film may be e.g. in the range of 1.55 to 1.65 at the wavelength of 550 nm. In particular, the face layer 10 may have been uniaxially or biaxially stretched so that the refractive index of the face layer is higher than 1.60. The label may be provided such that the uppermost surface is an interface between polyethylene terephthalate (PET) and air. The uppermost surface of the label may be implemented such that it does not comprise silicone polymer.

Reflection Coefficients

Figure 4A:
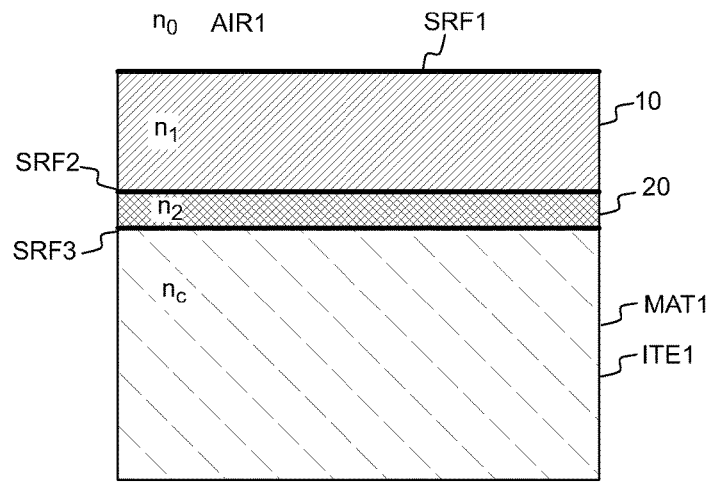
FIG. 4a shows, by way of example, in a cross-sectional view, refractive indices of the structural layers.
Figure 4B:
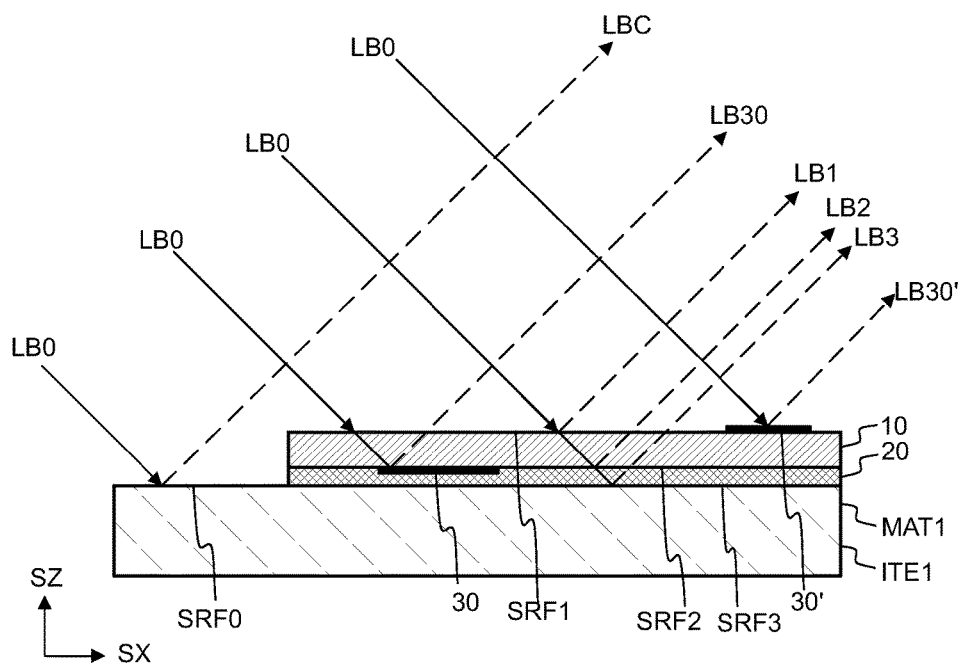
FIG. 4b shows, by way of example, in a cross-sectional view, reflection of light from the optical interfaces.

Referring to FIGS. 4a and 4b, the reflective properties of the labeled item may depend on the refractive indices of the layers of the label. $n_0$ denotes the refractive index of air AIR1. $n_1$ denotes the refractive index of the face layer 10. $n_2$ denotes the refractive index of the adhesive layer 20. $n_c$ denotes the refractive index of the material MAT1 of the surface of the item ITE1.

The label 100 may comprise a clear portion to transmit illuminating light LB0 to the surface of the item ITE1 and to transmit reflected light LB3 from the surface of the item ITE1 to the eye of a viewer.

SRF0 may denote the interface between air AIR1 and the bare surface of the item ITE1. SRF1 may denote the interface between air AIR1 and the face layer 10. SRF2 may denote the interface between the face layer 10 and the adhesive layer 20. SRF3 may denote the interface between the adhesive layer 20 and the surface of the item ITE1. The reflection coefficient R of the interface SRF0 may depend on the refractive indices $n_0$ and $n_c$ according to the following equations:

$$R_s = \left|\frac{n_0\cos\theta_i - n_c\cos\theta_t}{n_0\cos\theta_i + n_c\cos\theta_t}\right|^2 \quad (1a)$$

$$R_p = \left|\frac{n_0\cos\theta_t - n_c\cos\theta_i}{n_0\cos\theta_t + n_c\cos\theta_i}\right|^2 \quad (1b)$$

$$R = \frac{R_s + R_p}{2} \quad (1c)$$

$R_s$ denotes reflection coefficient for s-polarized light, $R_p$ denotes reflection coefficient for p-polarized light, R denotes the average of the coefficients $R_s$ and $R_p$, $\theta_i$ denotes input angle of illuminating light, and $\theta_t$ output angle of refracted light. The direction of illuminating light may be e.g. perpendicular to the surface SRF0, and the angles $\theta_i$ and $\theta_t$ may be equal to zero. When the input angle $\theta_i$ is equal to zero, the reflection coefficient $R_c$ of the interface SRF0 may be calculated according to the following equation:

$$R_c = \frac{(n_0 - n_c)^2}{(n_0 + n_c)^2} \quad (1d)$$

When the input angle $\theta_i$ is equal to zero, the reflection coefficient $R_1$ of the interface SRF1 may be calculated according to the following equation:

$$R_1 = \frac{(n_0 - n_1)^2}{(n_0 + n_1)^2} \quad (2)$$

When the input angle $\theta_i$ is equal to zero, the reflection coefficient $R_2$ of the interface SRF2 may be calculated according to the following equation:

$$R_1 = \frac{(n_1 - n_2)^2}{(n_1 + n_2)^2} \quad (3)$$

When the input angle $\theta_i$ is equal to zero, the reflection coefficient $R_2$ of the interface SRF2 may be calculated according to the following equation:

$$R_2 = \frac{(n_2 - n_c)^2}{(n_2 + n_c)^2} \quad (4)$$

The surface of the item and the label 100 may be illuminated with illuminating light LB0. The interface SRF0 may provide a reflected beam LBC by reflecting light of the illuminating beam LB0. The interface SRF1 may provide a reflected beam LB1 by reflecting light of the illuminating beam LB0. The interface SRF2 may provide a reflected beam LB2 by reflecting light of the illuminating beam LB0. The interface SRF3 may provide a reflected beam LB3 by reflecting light of the illuminating beam LB0. The printed region 30 may provide a reflected beam LB30 by reflecting light of the illuminating beam LB0. The printed region 30' may provide a reflected beam LB30' by reflecting light of the illuminating beam LB0. A human observer viewing a clear labeled portion detects the combined intensity of the beams LB1, LB2, LB3. $R_c$ denotes the reflection coefficient of the bare surface SRF0 of the item ITE1. The total reflection coefficient $R_{tot}$ of a clear labeled portion may be equal to the sum of the reflection coefficients of the surfaces SRF1, SRF2, and SRF3.

$$R_{tot} = R_1 + R_2 + R_3 \quad (5).$$

To the first approximation, the total reflection coefficient $R_{tot}$ of a clear labeled portion may be substantially equal to the sum of the reflection coefficients of the surfaces SRF1, SRF2, and SRF3.

To the first approximation, the visual contrast between the clear labeled portion and the bare surface of the item may be proportional to the relative difference $(R_c - R_{tot})/R_c$.

Smoothing Effect

The label 100 may be arranged to make certain imperfections of the item ITE1 less visible. For example, the label may provide a high quality appearance by smoothing an irregular shape of the item, and/or by hiding scratches of the surface of the item ITE1. The adhesive layer 20 may hide scratches of the surface of the item ITE1, and the thin face layer 10 may conform to the shape of the item. The face layer 10 may conform to the shape of the item such that the thin layer of adhesive layer 20 may be sufficient to hide visually detectable scratches of the surface of the item ITE1.

In case of a transparent item, the reflection coefficient $R_3$ of the interface between the adhesive layer 20 and the surface of the item may be low.

Figure 5A:
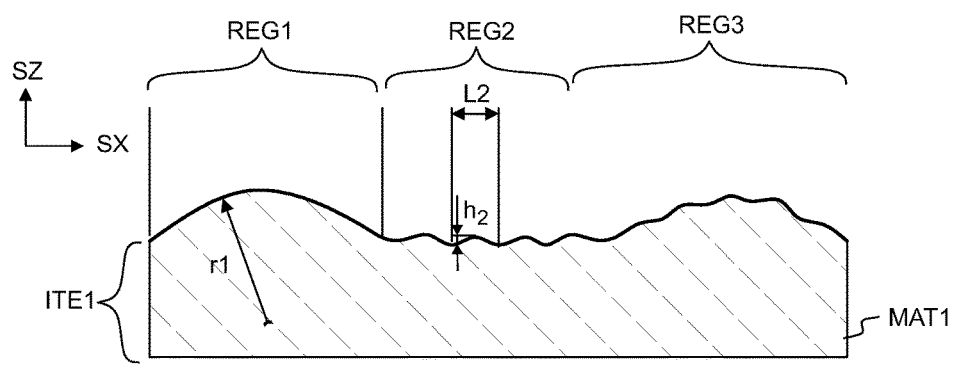
FIG. 5a shows, by way of example, in a cross-sectional view, an uneven surface of an item.
Figure 5B:
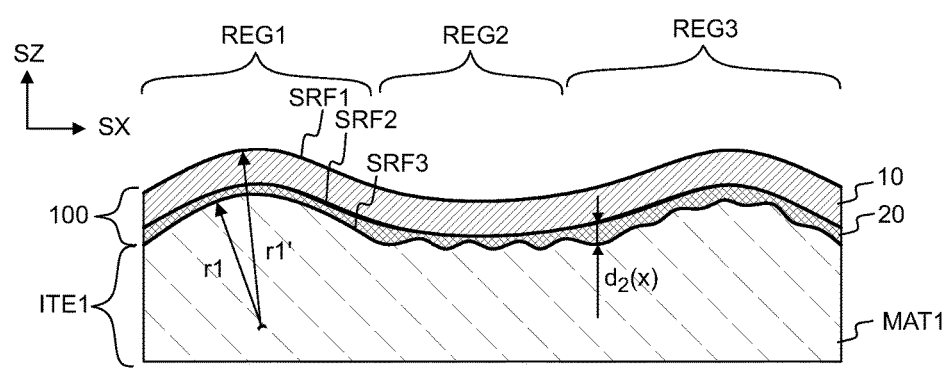
FIG. 5b shows, by way of example, in a cross-sectional view, a label attached to the uneven surface.

Referring to FIGS. 5a, and 5b, the item ITE1 may have one or more curved portions REG1, one or more irregular portions REG2, and/or one or more curved irregular portions REG3. The irregular portions REG2, REG3 may also be called e.g. a rough portions. The curved portion REG1 may have a radius of curvature $r_1$. The radius of curvature $r_1$ of the item ITE1 may be e.g. smaller than 50 mm.

The surface roughness of the portions may be specified e.g. by providing a $R_a$-value, which indicates the arithmetic average of the absolute values of the profile height deviations from the mean line, recorded within an evaluation length L2. In case of the thin face layer 10, the relevant evaluation length L2 may be e.g. equal to 1.0 mm. h2 may denote a maximum depth of a valley between two peaks within the evaluation length L2. $d_2(x)$ may denote a distance between the face layer 10 and the surface of the item ITE1 at a position x. The average value of the distance $d_2$ may be substantially equal to the thickness of the adhesive layer 20.

The thickness $d_{10}$ of the label 100 may be e.g. in the range of 10 μm to 25 μm. Thanks to the small thickness, the label 100 may conform to the curved shape of the item.

An average radius ($r_1'$) of curvature of the label (100) at a portion (REG1) may be e.g. in the range of 1.001 (=(10 mm+10 μm)/10 mm) to 1.005 (=(5 mm+25 μm)/5 mm) times the average radius (r1) of curvature of said portion (REG1), in a situation where the average radius (r1) of curvature of the label (100) at said portion (REG1) is in the range of 5 mm to 10 mm, and the width of said portion (REG1) is equal to 5 mm.

Conforming to the shape of the item may ensure that the label may be firmly attached to the item even when the thickness of the adhesive layer is small.

Consequently, optical reflections from the lower surface of the adhesive layer do not disturb the visual appearance of the label attached to the item. For example, more than 95% of the area of the label may be in contact with the surface of the item.

For example, an average thickness of an air gap enclosed between the adhesive layer 20 and the item ITE1 may be lower than 0.1 μm in an area, which overlaps 95% of the area of the label 100. 0.1 μm corresponds to an air gap, which is less than ¼ of the wavelength λ=550 nm. An air gap greater than 0.1 μm may cause a disturbing reflection from the interface between the air and the adhesive. An air gap greater than 0.1 μm may cause a disturbing reflection from the interface between the air and the surface of the item. An air gap greater than 0.1 μm may cause a disturbing reflection from an irregular surface of the item.

The label may smooth out irregularities and/or unevenness of the surface of the item. The adhesive may fill scratches on the surface of the item. The combination of the thin face layer and the adhesive may provide a capability to fill irregularities of a curved surface. The surface roughness value Ra of the surface of the item ITE1 may be e.g. in the range of 0.5μm to 5.0 μm. For example, average thickness of air enclosed between the adhesive layer 20 and the item ITE1 may be lower than 0.1 μm in an area, which overlaps 95% of the area of the label 100, when the surface roughness value Ra of the item ITE1 is in the range of 0.5 μm to 5.0 μm.

Method for Labeling Items

Referring to FIG. 6a, a labelstock STO1 may comprise a plurality of labels 100 carried by a release liner 90. The labels 100a, 100b, 100c may be e.g. substantially identical.

The labels and the release liner 90 may be optionally wound to form a roll. The labels and the release liner may together form a labelstock STO1. The labelstock STO1 may be provided as a wound roll. The labelstock STO1 may be stored and/or transported as a roll. The labelstock STO1 may be unwound from the roll, and the labelstock STO1 may be fed to a labeling apparatus 500.

Labeling Apparatus

Figure 6B:
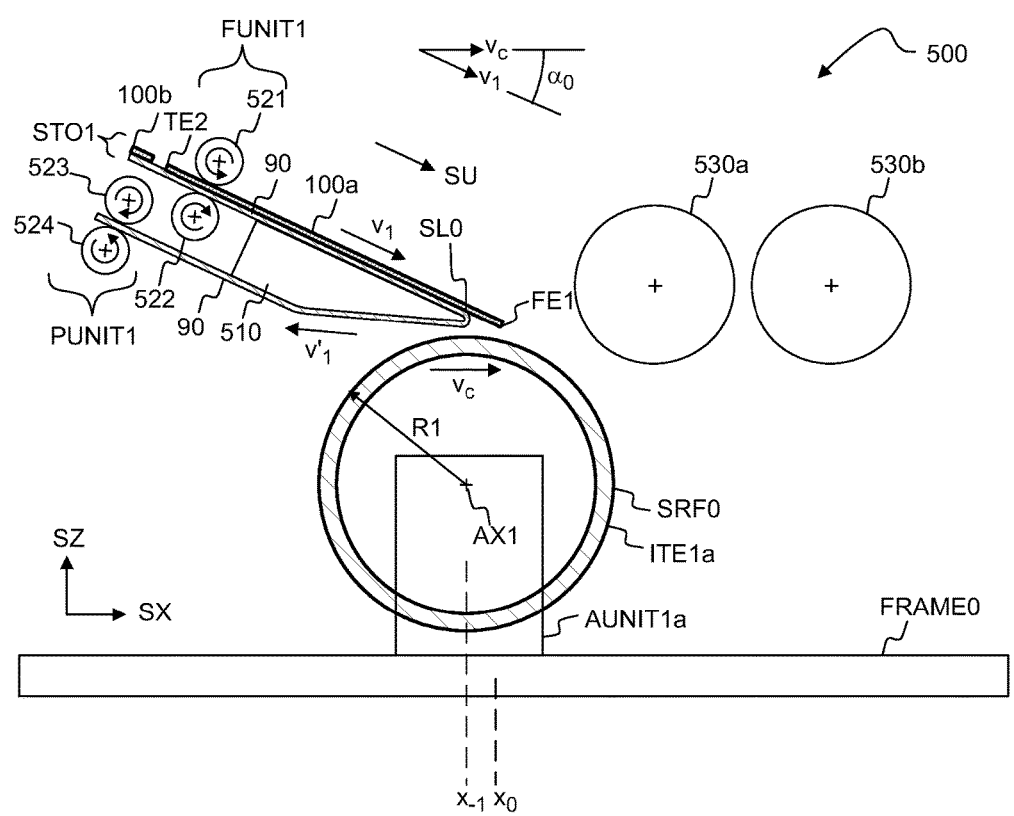
FIG. 6b shows, by way of example, in a cross-sectional view, the position of a label with respect to an item before contact.

Referring to FIG. 6b, a labeling apparatus 500 may comprise a peel plate 510, a feeding unit FUNIT1, a pulling unit PUNIT1, and an actuating unit AUNIT1a. The actuating unit AUNIT1a may move an item ITE1a with respect to the peel plate 510. The actuating unit AUNIT1a may move the item ITE1a with respect to a frame FRAME0. The actuating unit AUNIT1a may cause a translational and/or rotational movement of the item ITE1a with respect to the peel plate 510. The actuating unit AUNIT1a may cause a translational and/or rotational movement of the item ITE1a with respect to the pressure members 530a, 530b. The actuating unit AUNIT1a may cause a translational and/or rotational movement of the item ITE1a with respect to the frame FRAME0.

The feeding unit FUNIT1 may feed the labelstock STO1 at a velocity $v_1$ to the peel plate 510, and the pulling unit PUNIT1 may pull the release liner 90 at the velocity $v'_1$ from the peel plate 510. The feeding unit FUNIT1 and the pulling unit PUNIT1 may be arranged to cause suitable tension in the release liner 90. The velocity $v'_1$ may be equal to or slightly higher than the velocity $v_1$. The labelstock STO1 may comprise the release liner 90, and a plurality of labels 100a, 100b. The apparatus 500 may comprise one or more pressing members 530a, 530b to press the label 100a against the surface of the item ITE1a after the label 100a has been brought into contact with the item ITE1a. The feeding unit FUNIT1 may comprise e.g. a pair of rollers 521, 522, and the pulling unit PUNIT1 may comprise e.g. a pair of rollers 523, 524.

The release liner 90 may be bent sharply at the peel plate 510 so as to separate the label 100a from the release liner 90. The radius of curvature of the release liner 90 at the edge of the peel plate 510 may be smaller than a predetermined value. The leading edge FE1 of the label 100a may be separated from the release liner 90 by using the peel plate 510 so that the adhesive layer of the label 100a becomes partly exposed in the vicinity of the leading edge FE1. The leading edge FE1 of the label 100a may be moved in the direction SU at a velocity $v_1$. The label 100a has also a trailing edge TE2. The direction SU may be defined by the upper surface of the peel plate 510. The direction SU may denote the direction of movement of the release liner 90 at the upper side of the peel plate 510. An actuating unit AUNIT1a may move the surface SRF0 of the item ITE1a in the direction SX at a velocity $v_c$. The actuating unit AUNIT1a may be e.g. a conveyor belt or a carousel. $\alpha_0$ denotes an angle between the directions SX and SU. The angle $\alpha_0$ may be called e.g. as the feeding angle or as the angle of attack. The feeding angle $\alpha_0$ may be e.g. in the range of 10° to 30°, preferably in the range of 15° to 25°. The amount of air entrained between the label 100a and the item ITE1a may be controlled by selecting the feeding angle $\alpha_0$.

Increasing the feeding angle $\alpha_0$ may reduce the amount of air trapped between the label 100a and the item ITE1a.

During high speed labeling, the velocity $v_c$ may be e.g. higher than 0.5 m/s. The velocity $v_c$ may be e.g. in the range of 1 m/s to 10 m/s. The (maximum) velocity $v_1$ may be substantially equal to the velocity $v_c$. The (maximum) velocity $v_1$ may be e.g. in the range of 90% to 110% of the velocity $v_c$. The velocity $v_1$ may be rapidly accelerated before bringing the label 100a into contact with the item ITE1a.

The item ITE1a may be at a position $x_{-1}$ at a time $t_{a,-1}$, before the label 100a contacts the item ITE1a.

Separating Labels from Release Liner

The release liner 90 may be bent sharply at the peel plate 510 so as to separate the label 100a from the release liner 90. The radius of curvature of the release liner 90 at the peel plate may be smaller than a predetermined value. The stiffness of the face layer 10 may facilitate separation of the label from the release liner, in particular when the face layer consists of stretched PET.

Stretching of the Release Liner

The labelstock STO1 may have a velocity $v_0$ immediately before the entering the feeding unit FUNIT1. The pulling unit PUNIT1 may be arranged to pull the release liner 90 such that the velocity $v_1$ is e.g. 0.5% to 3% higher than the initial velocity $v_0$. In particular, the relative difference $(v_1-v_0)/v_0$ may be in the range of 1% to 2%. Consequently, the release liner 90 may be stretched by the pulling unit PUNIT1 such that the relative elongation of the release liner 90 is e.g. in the range of 1% to 2%. The high dimensional stability of PET film of the label 100 may cause slipping of the edge of the label 100a with respect to the release liner 90 when the release liner 90 is stretched. Thus, the dimensional stability of the label 100 and the stretching of the release liner 90 may together facilitate separation of the label 100a from the release liner 90.

Bringing the Label into Contact with the Item

Figure 6C:
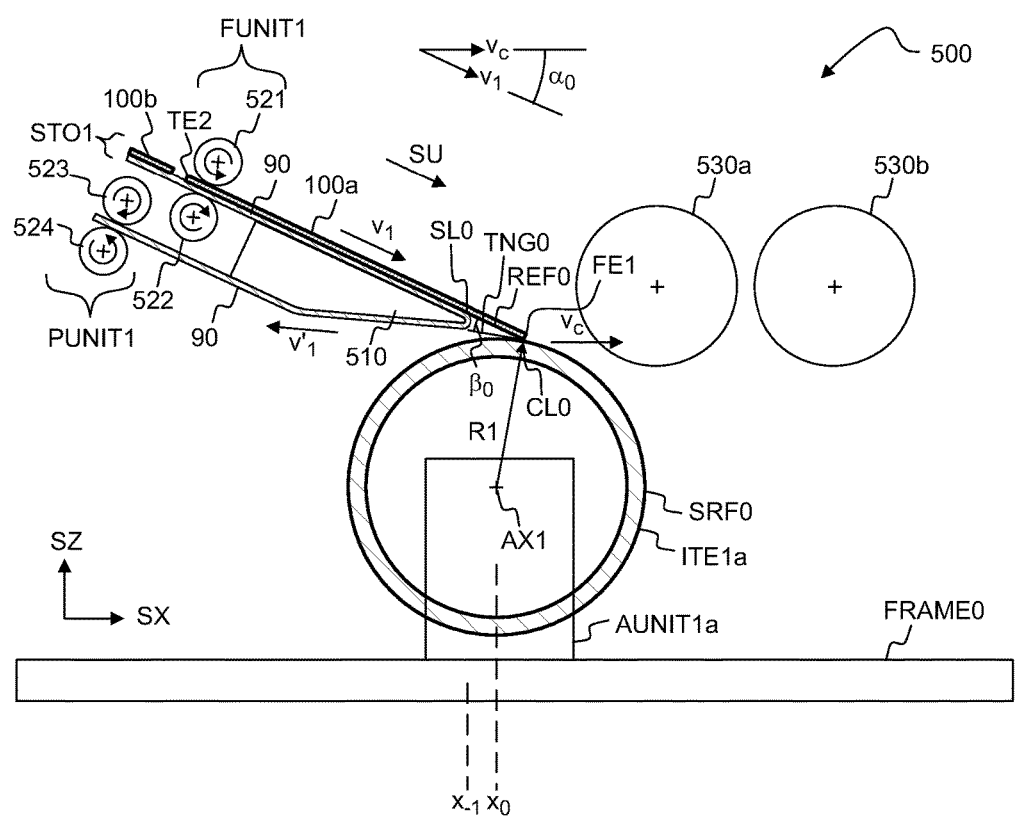
FIG. 6c shows, by way of example, in a cross-sectional view, the position of the label when the leading edge of the label contacts the item.

Referring to FIG. 6c, the label 100a may be moved at a velocity $v_1$ in the direction SU, and the item ITE1a may be simultaneously moved in the direction SX at the velocity $v_c$ such that the leading edge FE1 of the label 100a may contact the surface SRF0 of the item ITE1a. The leading edge FE1 of the label 100a may first contact the surface SRF0 at a time $t_{a,0}$. CL0 denotes a contact line where the label 100a meets the surface SRF0 of the item ITE1a. SL0 denotes a separation line where the label 100a is separated from the release liner 90. The item ITE1a may have a substantially circular perimeter, and the item ITE1 may have an axis of symmetry AX1. The item ITE1a may have a (main) radius or curvature R1. The item ITE1a may have a diameter, which is substantially equal to two times the main radius R1.

The separation line SL0 and the contact line CL0 may define a reference plane REF0. TNG0 denotes the tangent plane of the surface SRF0 at the contact line CL0. $\beta_0$ denotes the angle between the reference plane REF0 and the tangent plane TNG0 at the time $t_{a,0}$ when the label 100a first contacts the surface SRF0 of the item ITE1a. The orientation of the tangent plane TNG0 with respect to the direction SX may depend on the relative position of the item ITE1 with respect to the leading edge FE1. The orientation of the tangent plane TNG0 at the time $t_{a,0}$ may depend on the timing of the movement of the label 100a. The angle $\beta_0$ may be called e.g. as the relative angle or as the impact angle. The impact angle $\beta_0$ may depend e.g. on the feeding angle $\alpha_0$, on the position of the item ITE1a at the time $t_{a,0}$, and on the position of the leading edge FE1 at the time $t_{a,0}$. The impact angle $\beta_0$ may be e.g. in the range of 10° to 30°, preferably in the range of 15° to 25°. Increasing the impact angle $\beta_0$ may reduce the amount of air trapped between the label 100a and the item ITE1a. The feeding angle $\alpha_0$ may be selected and the movement of the label 100a may be timed with the movement of the item ITE1a such that the impact angle $\beta_0$ at the time $t_{a,0}$ is in the range of 10° to 30°, preferably in the range of 15° to 25°.

The direction SU may also denote the direction of movement of the leading edge FE1 of the label at the time $t_{a,0}$ of first contact. The direction SX may also denote the direction of movement of the surface SRF0 of the item ITE1a at the point where the leading edge FE1 first contacts the item ITE1a.

The method for labeling items ITE1, IT1a may comprise:
- separating a label 100a from a release liner 90 by using peel plate 510,
- moving the surface SRF0 of an item ITE1a in a first direction SX,
- moving the label 100a in a second direction SU, and
- bringing a leading edge FE1 of the label 100a into contact with a surface SRF0 of the item ITE1 such that the angle $\alpha_0$ between the first direction SX and the second direction SU is in the range of 10° to 30°.

The label 100a may comprise:
- a face layer 10, and
- an adhesive layer 20, wherein the face layer 10 may comprise semi-crystalline polymeric film, the adhesive layer may consist of one or more adhesive sub-layers, a lowermost adhesive sub-layer 20 of said adhesive sub-layers may comprise transparent polymeric adhesive, the thickness $d_{10}$ of the face layer 10 may be in the range of 10 μm to 50 μm, the thickness $d_{20}$ of the adhesive layer 20 may be in the range of 8 μm to 25 μm, and the thickness $d_{20}$ of the adhesive layer 20 may be smaller than 95% of thickness $d_{10}$ of the face layer 10.

The item ITE1a may be at a position $x_0$ at a time $t_{a,0}$, when the label 100a first contacts the item ITE1a.

Figure 6D:
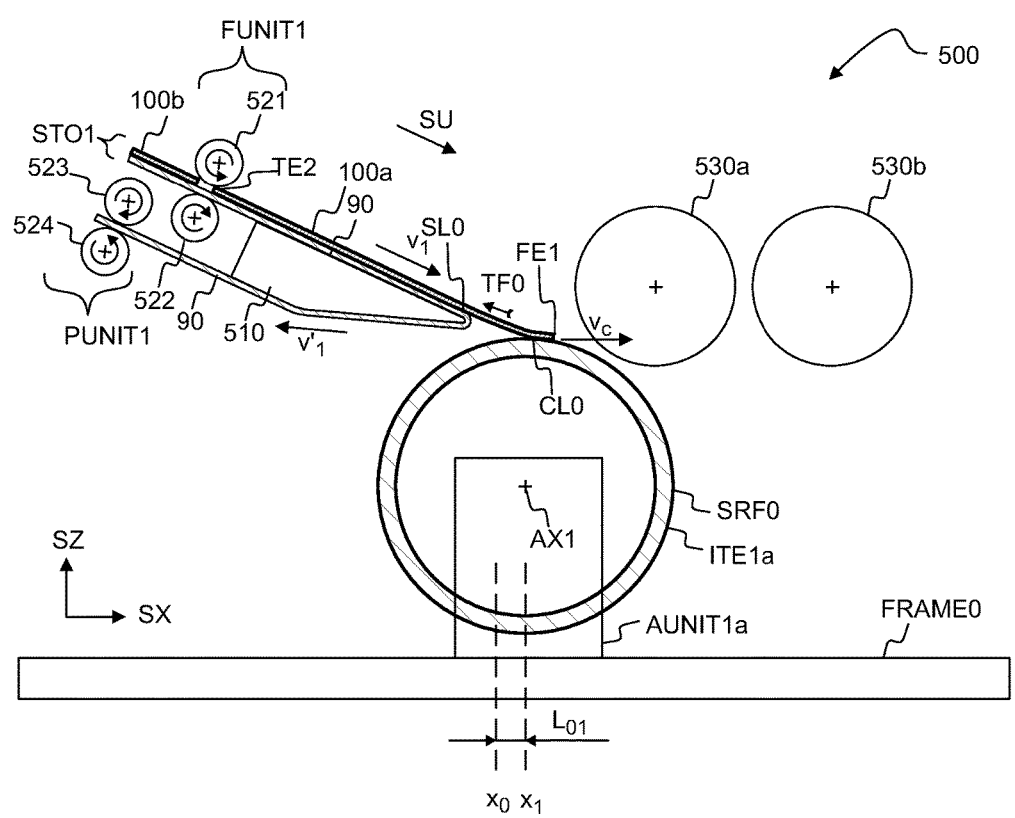
FIG. 6d shows, by way of example, in a cross-sectional view, the position of the label after the leading edge of the label has been brought into contact with the item.

Referring to FIG. 6d, the contact line CL0 may have moved farther away from the leading edge FE1 after the time $t_{a,0}$. A portion of the label 100a between the contact line CL0 and the leading edge FE1 may be adhered to the surface SRF0. Substantially the whole portion of the label 100a between the contact line CL0 and the leading edge FE1 may be in contact with the item ITE1a.

The trailing end TE2 of the label 100a may still be attached to the release layer 90. A portion of the label 100a between the trailing edge TE2 and the separation line SL0 may still be in contact with the release liner 90. The apparatus 500 may be arranged to cause a tension force TF0, which may control the orientation of the label 100a. The tension force TF0 may keep a portion of the label 100a substantially straight between the contact line CL0 and the separation line SL0. The tension force TF0 may keep the impact angle $\beta_0$ above a predetermined value, in order to reduce the amount of air trapped between the label 100a and the item ITE1a. The tension force TF0 may also depend on the peel force needed to separate the label 100a from the release liner 90.

The item ITE1a may be at a position $x_1$ at a time $t_{a,1}$, after the leading edge FE1 of the label 100a has been brought into contact with the item ITE1a.

Figure 6E:
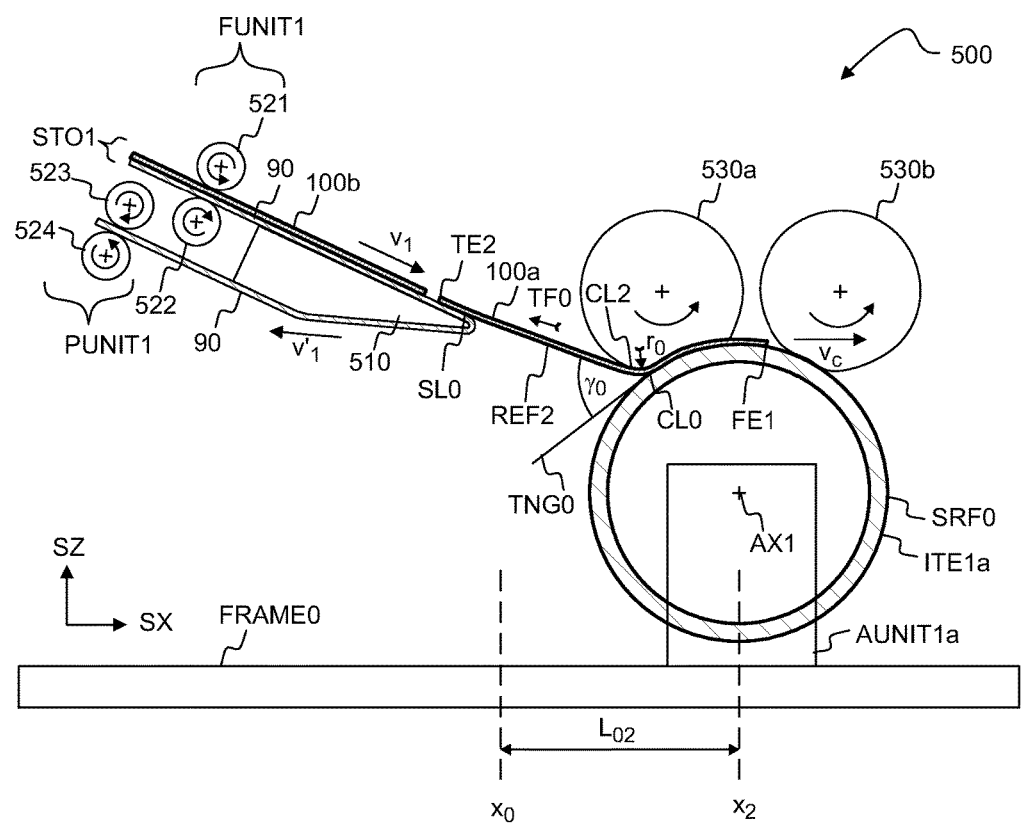
FIG. 6e shows, by way of example, in a cross-sectional view, the position of the label when the label is pressed by a pressing member.

Referring to FIG. 6e, the apparatus 500 may comprise one or more pressing members 530a, 530b for pressing the label 100a against the item ITE1a. The pressing member 530a, 530b may comprise e.g. elastic material for providing a pressing force. The elastic material may be e.g. porous elastic material. The elastic material may be e.g. foam rubber. The pressing member 530a may be e.g. a sponge. The pressing member 530a, 530b may be e.g. a roll coated with porous elastic material. The pressing member 530a, 530b may be e.g. a brush.

A first pressing member 530a may be arranged to press the label 100a against the item ITE1a such that the label 100a has a radius of curvature $r_0$ at the contact line CL0. The radius $r_0$ may be e.g. smaller than 20 mm, preferably smaller than 10 mm. The labeling method may comprise pressing the label ITE1a by a pressing member 530a such that a portion of the label 100a is temporarily bent, wherein the radius $r_0$ of curvature of the bent portion of the label 100a is smaller than 10 mm.

The first pressing member 530a may meet the upper side of the label 100a at an auxiliary contact line CL2. When the first pressing member 530a presses the label 100a, the trailing edge TE2 of the label 100a may still be attached to the release liner 90 such that the apparatus 500 may cause the tension force TF0 for keeping a portion of the label 100a substantially straight between the separation line SL0 and the auxiliary contact line CL2. The separation line SL0 and the auxiliary contact line CL2 may define an auxiliary reference plane REF2. The reference plane REF2 and the tangent plane TNG0 may define an auxiliary impact angle $\gamma_0$. The auxiliary impact angle $\gamma_0$ may be e.g. in the range of 5° to 90°. Using a large auxiliary impact angle $\gamma_0$ may effectively reduce the amount of air trapped between the label 100a and the item ITE1a.

The tension force TF0 and/or the small radius $r_0$ may effectively reduce the amount of air trapped between the label 100a and the item ITE1a. The label 100a tensioned by the force TF0 may temporarily have a curved portion between the contact line CL1 and the auxiliary contact line CL2. The curved portion may have the radius $r_0$ of curvature. The curved portion may be very stiff due to the high tensile modulus of the face layer 10. The curved tensioned portion may temporarily operate as a stiff reinforcing element, which may keep the contact line CL1 substantially straight. The size of an air bubble may depend on the height of a bulge formed at the contact line CL1. The size of the air bubble may be controlled by reducing the height of the bulges formed at the contact line CL1. The curved tensioned portion may reduce the size of air bubbles by effectively preventing formation of bulges in the vicinity of the contact line CL1. The curved tensioned portion may reduce the size of air bubbles by effectively preventing formation of bulges at the contact line CL1.

The item ITE1a may be at a position $x_2$ at a time $t_{a,2}$, when the label 100a is pressed against the item ITE1a by the pressing member 530a.

Figure 6F:
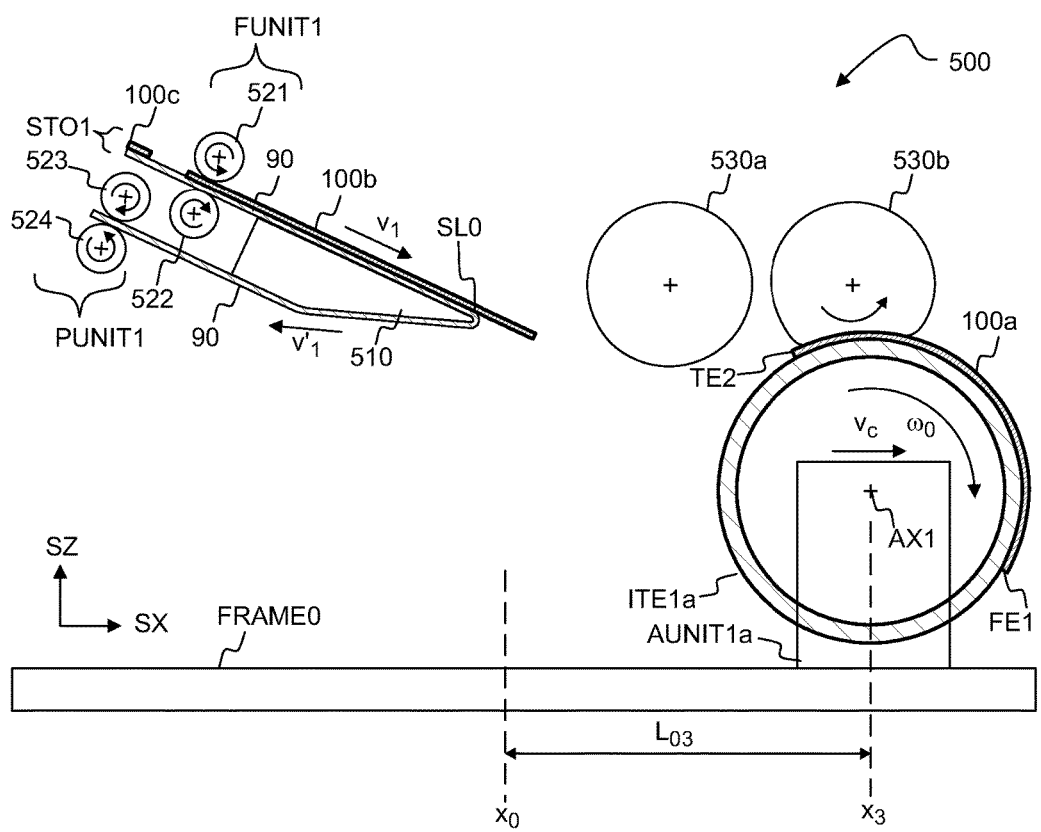
FIG. 6f shows, by way of example, in a cross-sectional view, the position of the label after the item has been rotated.

Referring to FIG. 6f, the actuating unit AUNITa may be optionally arranged to rotate the item ITE1a about an axis AX1, so that also the trailing edge TE2 of the label 100a may be pressed against the item ITE1a by a pressing member (e.g. the pressing member 530b). Consequently, substantially the whole label 100a may be brought into contact with the item ITE1a. The item ITE1a may be moved substantially in the direction SX during the rotation.

The rotation of the item ITE1a may be performed at an angular velocity $\omega_0$. The amount of air trapped between the label and the item during the rotation may be reduced by rotating the items ITE1a, ITE1b at a relatively low angular velocity $\omega_0$. The peel plate 510 may provide only one label at a time, whereas several items ITE1a, ITE1b may be rotated substantially simultaneously. Consequently, even in high speed labeling, the angular velocity $\omega_0$ of rotation may be arranged to be slow when compared with the translational velocity $v_c$ of the item ITE1a. In an embodiment, the rotation of the item ITE1a may be started e.g. after the leading edge FE1 of the label 100a has been brought into contact with the item ITE1a.

The item ITE1a may also be rotated e.g. by squeezing the item ITE1a between a first conveyor belt and a second conveyor belt, and by moving the first and the second conveyor belts at different velocities. In that case, the conveyor belts may operate as the actuating unit AUNIT1a and as the pressing members 530a, 530b.

The item ITE1a may be at a position $x_3$ at a time $t_{a,3}$, when the label 100a is pressed against the item ITE1a by the pressing member 530b.

Figure 6G:
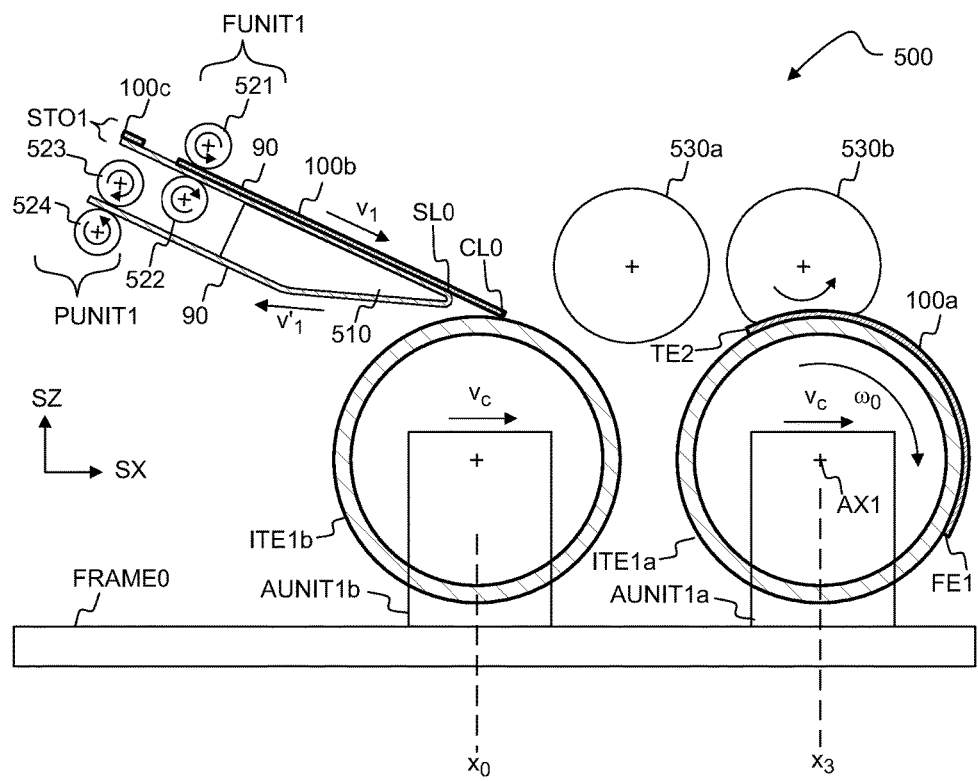
FIG. 6g shows, by way of example, in a cross-sectional view, labeling of several items.

Referring to FIG. 6g, the labelstock STO1 may comprise a plurality of labels 100a, 100b, 100c. A second label 100b may be brought into contact with a second item ITE1b after the trailing edge TE2 of the first label 100a has been separated from the release liner 90a. The second item ITE1b may be moved e.g. by an actuator unit AUNITb.

High Speed Labeling

The apparatus 500 may be arranged to label items at a high rate. The apparatus 500 may be arranged to attach labels to more than 750 items per minute. The apparatus 500 may be arranged to attach labels to items at a rate, which is in the range of 750 to 1600 labels per minute. The labeling rate of the apparatus 500 may be higher than 15 labels/second. The average velocity of the labelstock STO1 may be e.g. higher than 1 m/s.

Figure 6H:
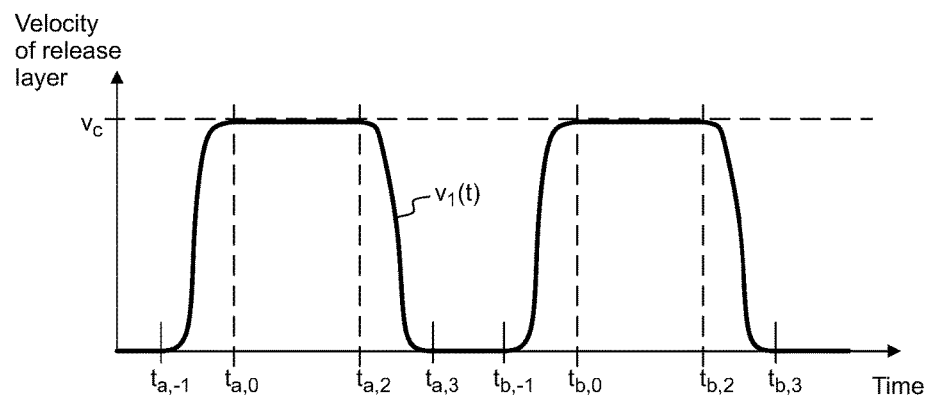
FIG. 6h shows, by way of example, the velocity of the release liner as a function of time during the labeling process.

Referring to FIG. 6h, the labelstock STO1 may be sequentially accelerated and decelerated e.g. more than 15 times per second. FIG. 6h shows the velocity $v_1(t)$ of the labelstock STO1 as the function of time t. The velocity $v_1(t)$ of the labelstock may be substantially equal to the velocity of the surface SRF0 of a first item ITE1 when a first label 100a is brought into contact with the first item ITE1. The velocity $v_1(t)$ of the labelstock may be temporarily reduced after the label 100a has been fully separated from the liner 90. A second item may be moved close to the peel plate 510 when the velocity $v_1(t)$ is low or zero. The labelstock may be accelerated again to the before the second label 100b is brought into contact with the second item. The peak acceleration of the labelstock STO1 during the labeling may be e.g. higher than 2000 m/s$^2$.

$t_{a,-1}$ and $t_{b,-1}$ may denote a time when the acceleration of the labelstock is started. $t_{a,0}$ and $t_{b,0}$ may denote a time when the label first contacts the item. At the time $t_{a,0}$ and $t_{b,0}$, the velocity $v_1(t)$ of the labelstock may attain the velocity $v_c$ of the surface SRF0. $t_{a,2}$ and $t_{b,2}$ may denote a time when the deceleration of the labelstock is started. $t_{a,3}$ and $t_{a,3}$ may denote a time when the deceleration of the labelstock is stopped.

The item ITE1a may be at a position $x_{-1}$ at the time $t_{a,-1}$. The item ITE1a may be at a position $x_0$ at the time $t_{a,0}$. The item ITE1a may be at a position $x_1$ at the time $t_{a,1}$. The item ITE1a may be at a position $x_2$ at the time $t_{a,2}$. The item ITE1a may be at a position $x_3$ at the time $t_{a,3}$. $L_{01}$ may denote the distance between the positions $x_0$ and $x_1$. $L_{02}$ may denote the distance between the positions $x_0$ and $x_2$. $L_{03}$ may denote the distance between the positions $x_0$ and $x_3$.

Figure 6I:
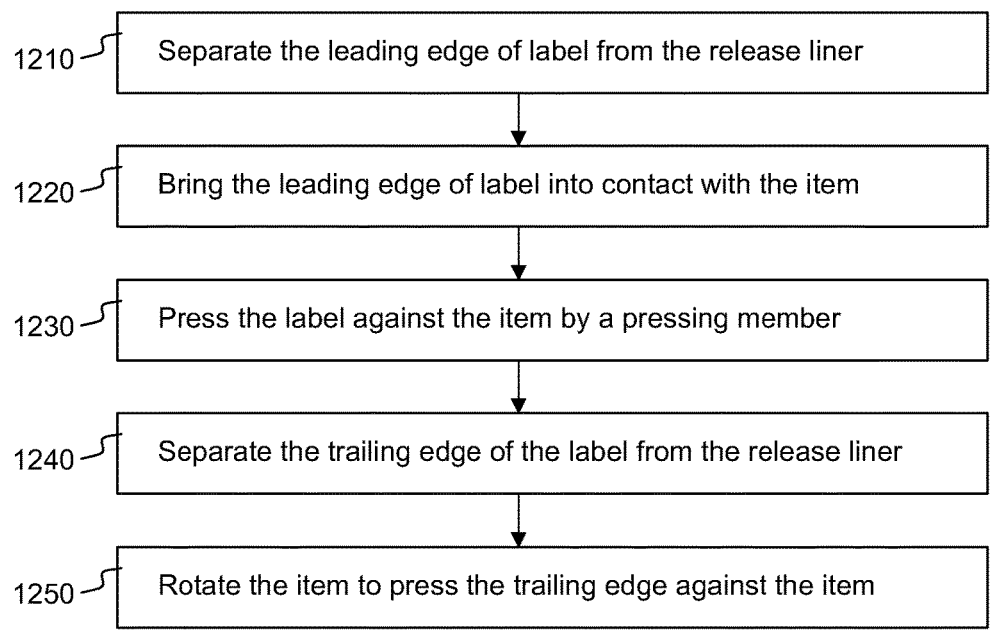
FIG. 6i shows, by way of example, method steps for high speed labeling.

FIG. 6i shows method steps for applying a label on the surface of an item. The steps of FIG. 6i may be suitable for high speed labeling.

The leading edge FE1 of the label 100a may be separated from the release liner 90 by using a peel plate 510 (step 1210).

The leading edge FE1 of the label 100a may be brought into contact with an item ITE1a (step 1220).

The label 100a may be pressed against the item ITE1a by pressing the label 100a with a pressing member 530a (step 1230).

The trailing edge TE2 of the label may be separated from the release liner (step 1240).

The item ITE1a may be optionally rotated in order to press the whole area of the label 100a against the item ITE1a (step 1250). The item ITE1a may be rotated in order to press also the trailing edge TE2 of the label 100a against the item ITE1a.

Controlling the Size of Air Bubbles

Sometimes an air bubble may be trapped between the adhesive layer and the surface of the item. When that happens, the air bubble may cause residual tensile stress TF1,TF2 in the face layer. The residual tensile stress TF1 of the face layer 10 may be arranged to eliminate the air bubble BUB1 by causing diffusion of air from the air bubble BUB1 through the face layer 10.

Also the adhesion of the adhesive layer to the surface of the item may facilitate elimination of air bubbles.

Figure 7A:
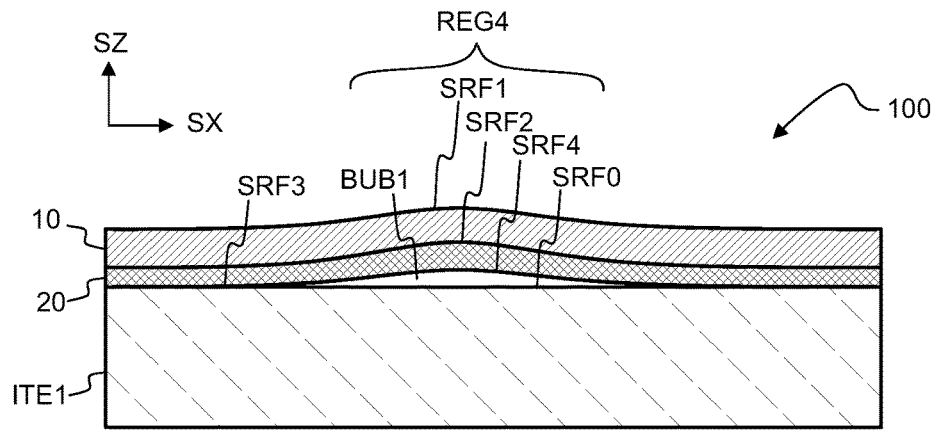
FIG. 7a shows, by way of example, in a cross-sectional view, an air bubble trapped between the adhesive layer and the item.

Referring to FIG. 7a, an air bubble (gas bubble) BUB1 may sometimes be trapped between the label and the item. REG4 may denote a region, which comprises an air bubble BUB1 immediately after the label has been attached to the item ITE1. The air bubble BUB1 may be located beneath a bulge of the label 100. The region REG4 may be vertically displaced with respect to a surrounding region. The adhesive layer 20 of the surrounding region may be in contact with the item ITE1. SRF3 may denote an interface between the adhesive layer 20 and the surface of the item ITE1. SRF4 may denote an interface between the adhesive layer 20 and air. The vertical distance between the lowermost surface of the adhesive layer 20 and the surface SRF0 of the item ITE1 may be greater than zero at the position of the air bubble BUB1. The distance between the interface SRF4 and the surface SRF0 of the item ITE1 may be greater than zero at the position of the air bubble BUB1. The thickness of the air bubble BUB1 may be e.g. greater than 0.5 µm. The adhesive layer 20 is not in contact with the item ITE1 at the position of the air bubble BUB1.

Figure 7B:
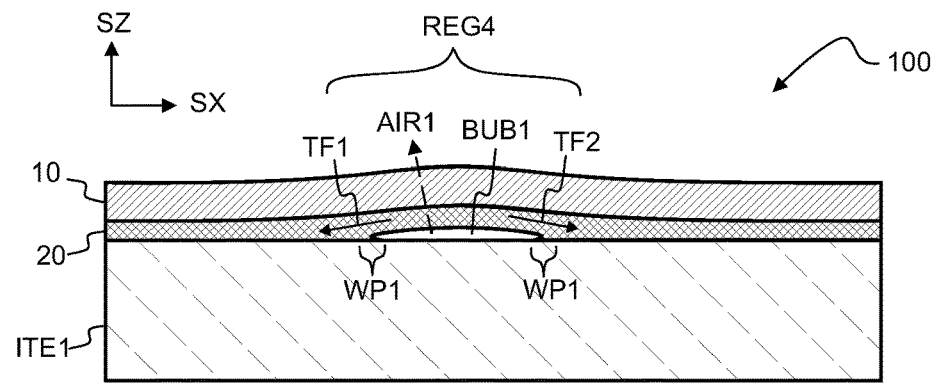
FIG. 7b shows, by way of example, in a cross-sectional view, diffusion or air away from the air bubble.

Referring to FIG. 7b, a residual stress of the face layer 10 and/or adhesive wetting may be arranged to cause an overpressure in the air bubble BUB1 so as to cause diffusion of air AIR1 (gas) out of the bubble BUB1. The tension TF1, TF2 of the stiff PET face film may create an overpressure for causing diffusion of air AIR1 out of the bubble BUB1. By selecting dispensing geometry and the stiffness of the face layer 10, the formation air bubbles may be minimized or prevented.

The adhesive may also cause wetting of the surface of the item so that overpressure may be generated in the bubble. The overpressure may cause diffusion of air AIR1 out of the bubble BUB1. The wetting may take place at a wetting portion WP1.

The polymeric adhesive may be a pressure sensitive adhesive. The adhesion strength of the adhesive may develop as a function of time. The strength of the adhesive may increase after the label has been attached on the substrate surface. The length of the time period needed to form a suitable strength may be called as the adhesive set-up time. The adhesive set-up time may be e.g. longer than 30 minutes, longer than 1 hour, or even longer than 24 hours. The long set-up time may facilitate wetting.

The low thickness of the polyester film 10 may increase the rate of diffusion of air AIR1 through the face layer 10. The permeability of the face layer 10 for air may be e.g. higher than or equal to 1 cm$^3$/m$^2$·24 hours·100 kPa at the temperature of 25° C. The face layer 10 may comprise or consist of polyethylene terephthalate (PET). Using PET as the material of the face layer may provide sufficient permeability so as to control the size of air bubbles. The permeability of polyethylene terephthalate may be higher than the permeability of polyethylene naphthalate (PEN).

The face layer 10 may be arranged to allow diffusion or air and/or nitrogen through the face layer 10. The face layer 10 may be filmic polyester, and the permeability of the face layer 10 for nitrogen may be equal to or higher than 1 cm$^3$/m$^2$×24 hours×100 kPa. The permeability may be determined according to standard DIN 53380.

Figure 7C:
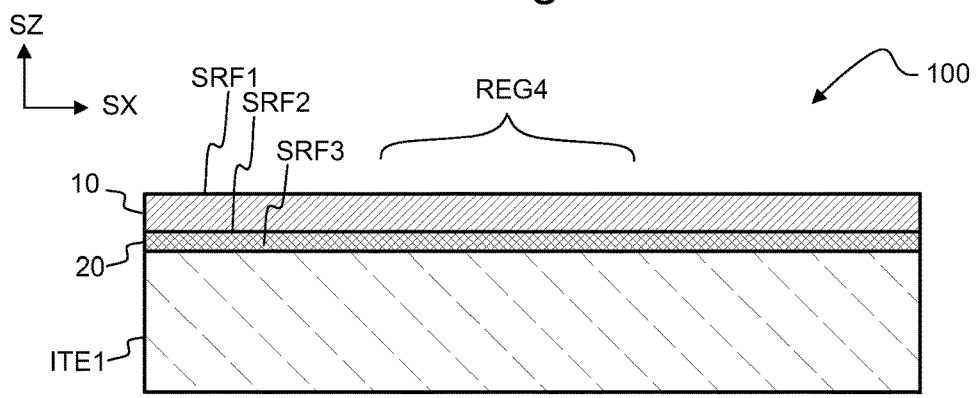
FIG. 7c shows, by way of example, in a cross-sectional view, a portion where the air bubble has been substantially eliminated.

Referring to FIG. 7c, the bubbles BUB1 may be arranged to disappear after the label has been dispensed. The method of dispensing the label may comprise reducing the size of air bubbles BUB1 by causing diffusion of air from the air bubble BUB1 through the face layer 10 during at least 24 hours.

Producing the Labelstock

A labelstock STO1 may be formed of a label laminate web by die-cutting labels 100 and stripping excess matrix material away from the release liner 90, such that the labels 100 remain attached on the release liner 90.

Figure 8:
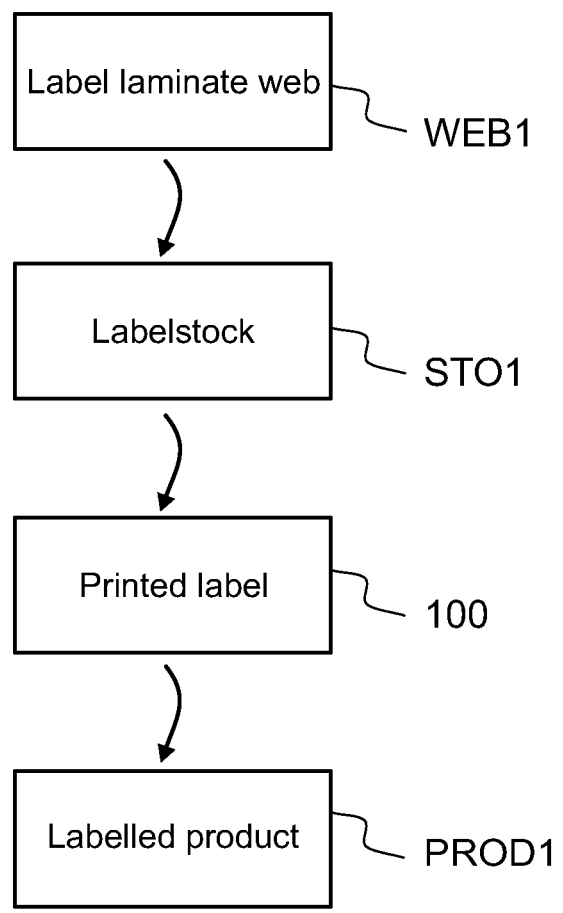
FIG. 8 shows, by way of example, a product chain from a label laminate web to a labelled product.

Referring to FIG. 8, a production chain for producing a labeled product PROD1 may comprise:
forming a label laminate web WEB1,
forming a labelstock STO1 from the label laminate web WEB1,
separating a printed label 100 from the labelstock STO1, and
attaching the printed label 100 to an item to provide a labeled product PROD1.

Figure 9A:
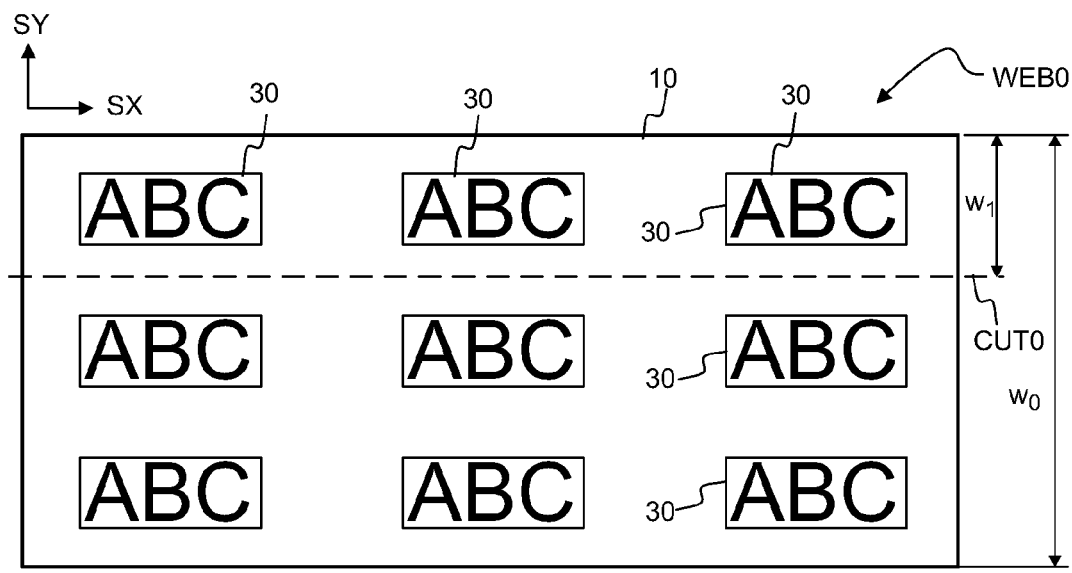
FIG. 9a shows, by way of example, in a top view, a printed web.
Figure 9B:
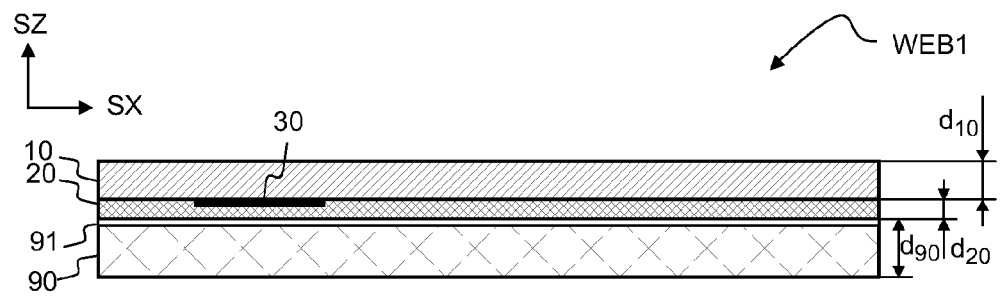
FIG. 9b shows, by way of example, in a cross-sectional view, a release liner laminated to the printed web.

Referring to FIG. 9a, label laminate web WEB0 may have an initial width $w_0$. A plurality of printed regions 30 may have been formed on the face layer 10 by printing. A plurality of printed regions 30 may have been formed on the face layer 10 by wide web printing. The face layer 10 and the printed regions 30 may be subsequently coated with the adhesive layer 20 e.g. by curtain coating so as to form the label laminate web WEB0. Alternatively, the adhesive layer 20 may be formed on a release layer 90, and the combination of the adhesive layer 20 and release layer 90 may be laminated together with the face layer 10.

The label laminate web WEB0 may be longitudinally cut to form a narrower label laminate web WEB1. The web WEB0 may be cut e.g. along a longitudinal line CUT0. The web may have a width $w_1$. The width $w_1$ may be smaller than the width initial width $w_0$.

Referring to FIG. 9b, the label laminate web WEB1 may comprise the face layer 10, the adhesive layer 20, and one or more printed regions 30. The label laminate web WEB1 may further comprise a release liner 90. The release liner 90 may be coated with a release coating 91. The release liner 90 may have a thickness $d_{90}$.

Figure 9C:
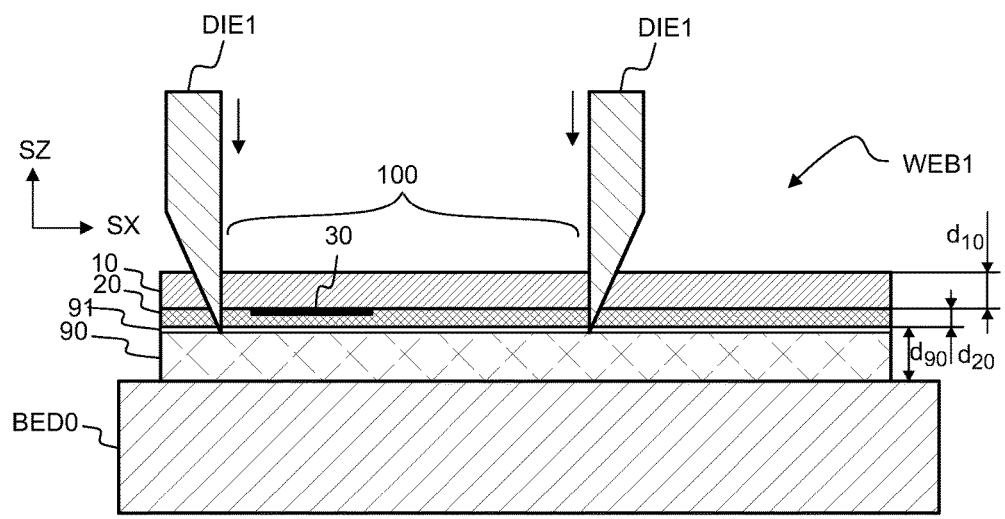
FIG. 9c shows, by way of example, in a cross-sectional view, forming the edges of a label by die-cutting.

Referring to FIG. 9c, individual labels 100a, 100b may be cut from the web WEB1 e.g. by using a die-cutting blade DIE1 and a base BED0. The cutting edge of the blade DIE1 may penetrate through the face layer 10 and through the adhesive layer 20. The cutting edge of the blade DIE1 may also slightly penetrate into the release liner 90. Advantageously, the blade DIE1 does not cut completely through the release liner 90. A labelstock STO1 may be formed from the web WEB1 e.g. by the die-cutting.

The thickness of the $d_{90}$ of the release liner 90 may be selected to facilitate precision die-cutting. In particular, the release liner 90 may comprise dimensionally stable and relatively hard polyester in order to allow precision cutting. The release liner 90 may comprise polyester in order to allow precision cutting.

Figure 9D:
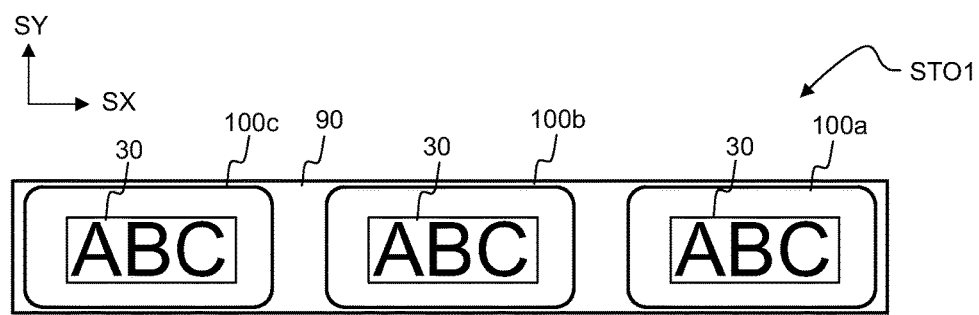
FIG. 9d shows, by way of example, in a top view, a labelstock comprising a plurality of labels.

Referring to FIG. 9d, the labelstock STO1 may comprise a plurality of labels 100a, 100b, 100c carried by a common release liner 90.

Figure 9E:
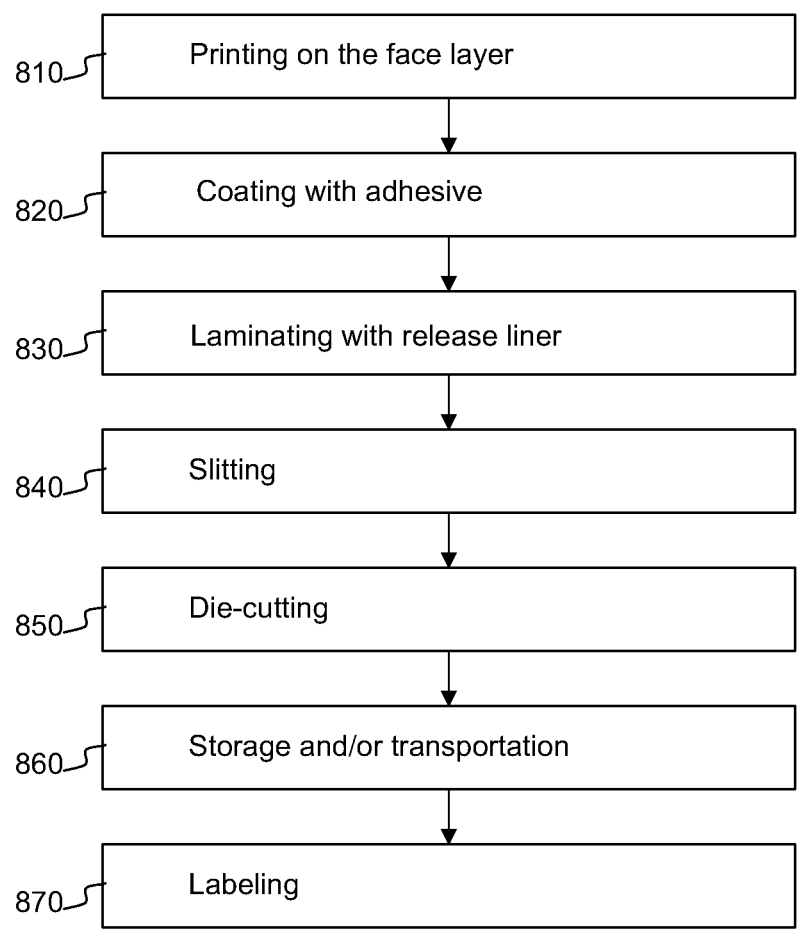
FIG. 9e shows, by way of example, method steps for providing a plurality of labels.

FIG. 9e shows method steps for forming the labelstock STO1 and labeling items with the labels of the labelstock.

In step 810, the face layer may be printed to form the printed regions 30. The printed regions 30 may comprise markings MRK1.

In step 820, the printed face layer may be coated with the adhesive. The adhesive layer may comprise one or more adhesive sub-layers.

In step 830, the combination of the face layer 10 and the adhesive layer 20 may be laminated with a release layer in order to form label laminate web WEB0.

In step 840, one or more narrower webs WEB1 may be cut from the web WEB0.

In step 850, the labels may be cut e.g. by die-cutting. Labelstock STO1 may be formed from the web WEB1 by die-cutting.

In step 860, the labelstock STO1 may be stored and/or transported.

In step 870, the labels 100a, 100b, 100c of the labelstock STO1 may be attached to items, so as to provide labeled items PROD1.

Figure 10C:
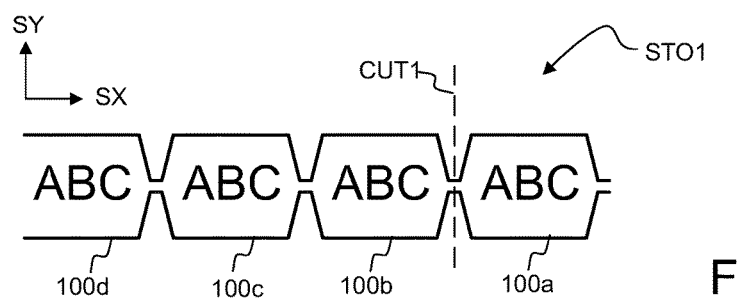
FIG. 10c shows, by way of example, in a top view, a labelstock comprising a plurality of linerless labels.
Figure 10D:
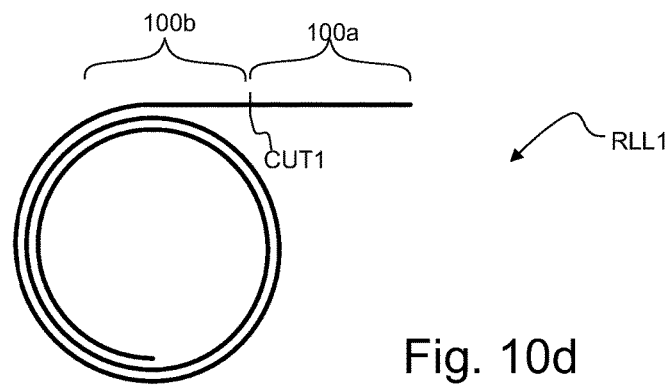
FIG. 10d shows, by way of example, in a cross-sectional view, a roll, which comprises a plurality of linerless labels.

Referring to FIGS. 10a to 10d, the label 100 or labels 100a, 100b, 100c may also be provided as linerless labels. The linerless labels may be supplied e.g. as a stack (i.e. a pile) or as a roll RLL1. The upper surface of the face layer 10 may be coated with a release coating 91, so as to facilitate separation of the labels from each other. Referring to FIGS. 10c and 10d, a first label 100a may be separated from a second adjacent label 100b e.g. by cutting or tearing the labels apart along a line CUT1.

Figure 11A:
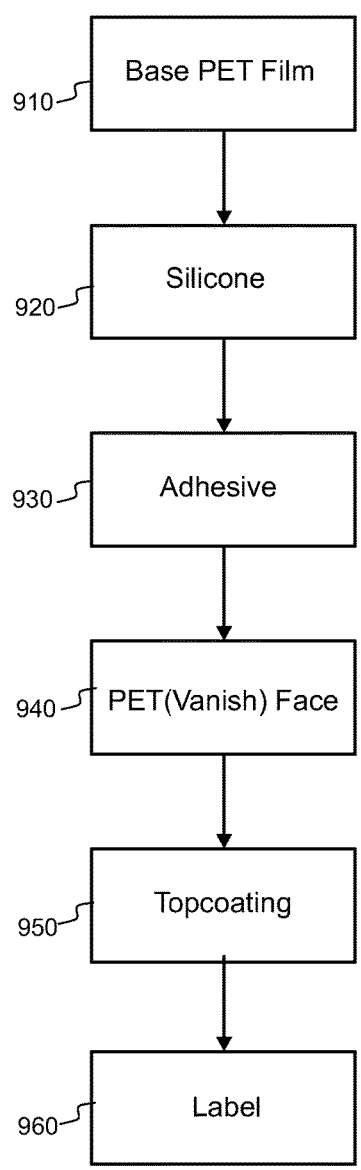
FIG. 11a shows, by way of example, steps of a production chain.

Referring to FIG. 11a, the label laminate web may also be formed e.g. by providing a base film (step 910), and coating the base film by a release coating 91 in order to form the release layer 90 (step 920). The adhesive layer 20 may be applied on the release layer 90 e.g. by curtain coating (step 930). The printed face layer 30 may be subsequently applied on top of the adhesive layer 20 in order to form the label laminate web WEB0, WEB1 (step 940). The label laminate web WEB0, WEB1 may be optionally topcoated (step 950). The labels 100a, 100b, 100c may be cut from the face layer 10 in step 960.

Figure 11B:
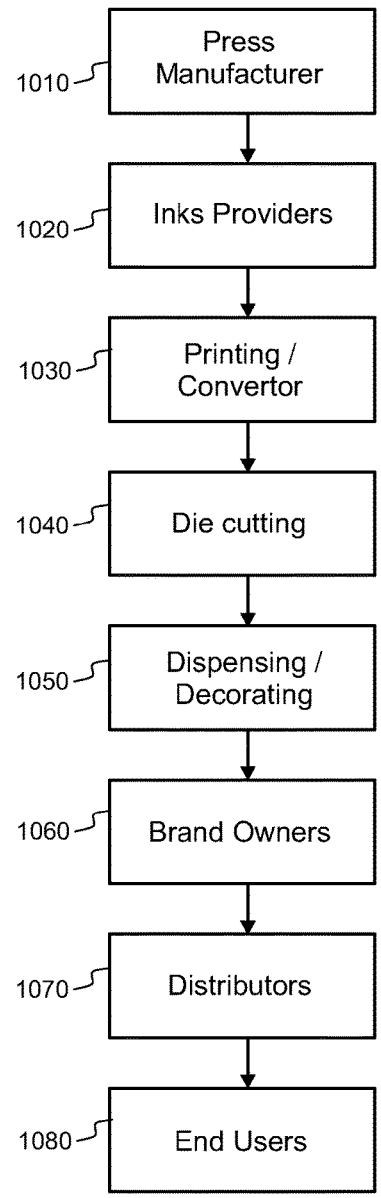
FIG. 11b shows, by way of example, various resources of a supply chain.

Referring to FIG. 11b, the supply chain may utilize various resources for providing and using labeled items. For example, a press manufacturer may provide a printing machine for forming the printed regions 30 (resource 1010). An ink provider may provide printing ink for forming the printed regions 30 (resource 1020). The regions 30 may be formed on the face layer 10 by using a printing machine (resource 1030). the labels 100a, 100b may be cut by using die-cutting apparatus (resource 1040). The labels may be attached to items by using a labeling apparatus 500 (resource 1050). The supply chain may utilize contribution from brand owners (resource 1060), contribution from distributors (resource 1070). The labeled items may be delivered to end users (resource 1080). The list of FIG. 11b is non-exhaustive.

Tensile Strength

The tensile strength $\sigma_{10}$ of the polyester film may be e.g. higher than or equal to 140 MPa. The polyester film may be bi-axially oriented, and the tensile strength of the polyester film may be e.g. higher than or equal to 140 MPa in the machine direction (MD), and the tensile strength of the polyester film may be e.g. higher than or equal to 140 MPa in the cross direction (CD).

The tensile strength ($\sigma_{10}$) of the polyester film face layer (at break) may be equal to or higher than 200 MPa. The face layer may be uniaxially or biaxially oriented. When the polyester film is bi-axially oriented, the tensile strength of the polyester film may be similar in both machine direction and cross direction higher. The face layer 10 may be made of a PET film. The tensile strength of the PET film (at break) may be e.g. than higher than or equal to 200 MPa in the machine direction (MD), and the tensile strength of the polyester film at break may be higher than or equal to 200 MPa in the cross direction (CD). The tensile strength of the PET film may be e.g. than higher than or equal to 220 MPa (32000 psi) in the machine direction (MD), and the tensile strength of the polyester film may be higher than or equal to 220 MPa (32000 psi) in the cross direction (CD). The tensile strength may be determined according to standard ASTM D 882.

Ultimate Elongation

The ultimate elongation of the polyester film face layer may be in the range of 65 to 190%. For example, the ultimate elongation of the polyester film face layer may be higher than or equal to 110%. The face layer may comprise or consist of bi-axially oriented PET film, wherein the elongation of the PET film may be e.g. higher than or equal to 140% in the machine direction (MD), and the elongation of the PET film may be e.g. higher than or equal to 140% in the cross direction (CD). The ultimate elongation may be determined according to standard ASTM D 882.

Degree of Crystallization

The face layer 10 may comprise semi-crystalline polymeric film. The degree of crystallization may have an effect on optical, mechanical, thermal and chemical properties of the polymer. The degree of crystallization of the semi-crystalline polymeric film may be in the range of 10% to 80%. The polymeric film may be oriented by uniaxial or biaxial stretching. The stretching may increase elastic modulus and/or refractive index of the face layer 10.

UV Protection

In an embodiment, the face layer 10 may protect the printed region 30 from ultraviolet radiation (UV). For example, sunlight may comprise UV radiation. The UV radiation may bleach the color of the printed region 30. The face layer 10 may optionally comprise an additive, which may absorb UV radiation. The face layer may be substantially transparent in the wavelength range of 380 nm to 760 nm, wherein the face layer may absorb UV radiation in the UV range.

The face layer 10 may protect the printed region 30 against the bleaching effect of sunlight.

Tendency to Build Up Static Charge

Filmic polyester may have a tendency to build up static electric charge. Reducing the thickness of the face layer may provide a label, which has a reduced tendency to build up static electric charge.

Adhesive Dispersion

Producing the label may comprise applying an adhesive dispersion on the face layer 10 or on the release layer 90. The adhesive layer 20 may be produced by applying the adhesive dispersion on the face layer 10 or on the release layer 90. The dispersion may have low viscosity value. The low viscosity may facilitate forming a substantially uniform thickness of the adhesive layer 20. The low viscosity may facilitate forming a substantially uniform thickness of the label 100. The polymeric adhesive may be applied, for example by curtain coating. The exposed surface of the adhesive may be optionally leveled e.g. by a linear smoothing bar. The thickness of the printed region may be non-negligible. The low viscosity may facilitate eliminating an elevated region, which could be caused by the thickness of the printed region 30.

The viscosity of the polymeric adhesive may be equal to or less than 2000 centipoises, preferably lower than 1600 centipoises. The viscosity of the polymeric adhesive may be, for example, in the range of 1200 to 1600 centipoises, when measured with a Brookfield RVT Viscometer with #3 spindle at 20 rotations per minute (rpm) according to the manufacturer's instructions. One centipoise corresponds to one mPa×s in SI-units.

The adhesive dispersion may be applied on the semi-crystalline polymeric film such that the polymeric film does not absorb the adhesive dispersion to a significant degree.

Temperature Range

The service temperature range of the polymeric adhesive of the label 100 may comprise e.g. the range of −60° F. to 300° F. (−51° C. to 149° C.). The service temperature range of the polymeric adhesive may comprise e.g. the range of −40° F. to 200° F. (−40° C. to 93° C.).

The label may be applied to the item e.g. at a temperature, which is higher than or equal to 23° F. (5° C.).

SX, SY, and SZ denote orthogonal directions.

Various aspects are illustrated by the following examples:

EXAMPLE 1

A label, comprising:
a face layer, and
an adhesive layer,
wherein the face layer comprises semi-crystalline polymeric film, the adhesive layer consists of one or more adhesive sub-layers, a lowermost adhesive sub-layer of said adhesive sub-layers comprises transparent polymeric adhesive, the thickness of the face layer is in the range of 10 μm to 50 μm, the thickness of the adhesive layer is in the range of 8 μm to 25 μm, the thickness of the adhesive layer is smaller than 95% of the thickness of the face layer, an uppermost sub-layer of said adhesive sub-layers is in contact with the face layer, and the refractive index of the uppermost adhesive sub-layer is in the range of 80% to 98.5% of the refractive index of the semi-crystalline polymeric film.

EXAMPLE 2

The label of example 1, wherein the total thickness of the label is in the range of 150% to 195% of the thickness of the face layer, the total thickness of the label being the thickness from the uppermost surface of the face layer to the lowermost surface of the lowermost adhesive sub-layer.

EXAMPLE 3

The label of example 1, wherein semi-crystalline polymeric film is a polyester film.

EXAMPLE 4

The label of example 3, wherein the polyester film is polyethylene terephthalate film.

EXAMPLE 5

The label of example 4, wherein the permeability of the face layer for air is higher than or equal to 1 cm$^3$/m$^2$·24 hours·100 kPa at the temperature of 25° C.

EXAMPLE 6

The label of example 3, wherein the tensile modulus of the face layer is higher than or equal to 4000 MPa in the machine direction.

EXAMPLE 7

The label of example 3, wherein the polyester film is bi-axially oriented, and the tensile strength of the polyester film is higher than or equal to 200 MPa in the machine direction, and the tensile strength of the polyester film is higher than or equal to 200 MPa in the cross direction.

EXAMPLE 8

The label of example 3, wherein the hardness of the face layer is higher than 94 in the Rockwell M scale.

EXAMPLE 9

The label of example 1, wherein the polymeric adhesive comprises an acrylic emulsion polymer.

EXAMPLE 10

The label of example 1, wherein the surface tension of the polymeric adhesive is lower than or equal to 40 dyn/cm at the temperature of 25° C.

EXAMPLE 11

The label of example 1, wherein the advancing contact angle for wetting a polyethylene terephthalate surface with the polymeric adhesive is lower than 70° at the temperature of 25° C.

EXAMPLE 12

The label of example 1, wherein the uppermost surface of the label has been coated with a release coating.

EXAMPLE 13

The label of example 1, wherein the label is attached to a release liner such that the adhesive layer is between the face layer and the release liner.

EXAMPLE 14

The label of example 13 wherein the release liner comprises polyester.

EXAMPLE 15

The label of example 13, wherein the label is carried by the release layer, and the release value of the label is higher than 0.15 N in a situation where a sample piece of the label is separated from the release liner at an angle of 180° at a velocity of 1200 inches per minute at the temperature of 25° C., the width of said sample piece being equal to 2 inches.

EXAMPLE 16

The label of example 1, wherein the refractive index of the polyester film is in the range of 1.55 to 1.65 at the wavelength of 550 nm.

EXAMPLE 17

The label of example 1, wherein the face layer has been stretched so that the refractive index of the face layer is higher than 1.60.

EXAMPLE 18

The label of example 1 comprising a printed region.

EXAMPLE 19

The label of example 18, wherein the printed region has been implemented between the face layer and the adhesive layer.

EXAMPLE 20

The label of example 1, wherein the haze level of the polyester film is lower than or equal to 6.5%.

EXAMPLE 21

The label of example 18, wherein the shape of the perimeter of the printed region of the label is substantially different from the shape of the perimeter of the label.

EXAMPLE 22

A labeled item, comprising a label attached to the surface of the item, said label comprising:
  a face layer, and
  an adhesive layer,
wherein the face layer comprises semi-crystalline polymeric film, the adhesive layer consists of one or more adhesive sub-layers, a lowermost adhesive sub-layer of said adhesive sub-layers comprises transparent polymeric adhesive, the thickness of the face layer is in the range of 10 μm to 50 μm, the thickness of the adhesive layer is in the range of 8 μm to 25 μm, the thickness of the adhesive layer is smaller than 95% of thickness of the face layer, an uppermost sub-layer of said adhesive sub-layers is in contact with the face layer, and the refractive index of the uppermost adhesive sub-layer is in the range of 80% to 98.5% of the refractive index of the semi-crystalline polymeric film.

EXAMPLE 23

The labeled item of example 22, wherein the surface of the item has a first reflection coefficient, a labeled portion of the labeled item has a second reflection coefficient, and the relative difference between the first reflection coefficient and the second reflection coefficient is smaller than 20%.

EXAMPLE 24

The labeled item of example 22, wherein an interface between the face layer and the adhesive layer has a reflection coefficient, the uppermost layer of the label has a reflection coefficient, and the reflection coefficient of the interface is smaller than 10% of the reflection coefficient of the uppermost layer.

EXAMPLE 25

The labeled item of example 22, wherein the surface roughness value of the surface is in the range of 0.5 μm to 5 μm.

EXAMPLE 26

The labeled item of example 22, wherein the label comprises a printed region between the face layer and the adhesive layer, and the distance between the printed region and the surface of the item is in the range of 50% to 95% of the thickness of the face layer.

EXAMPLE 27

The labeled item of example 22, wherein the item is a transparent container made of glass.

EXAMPLE 28

The labeled item of example 22, wherein the item is a transparent container made of polyethylene terephthalate.

EXAMPLE 29

The labeled item of example 22, wherein the uppermost surface of the label comprises silicone polymer.

EXAMPLE 30

The labeled item of example 22, wherein the label comprises a clear portion to transmit illuminating light to the surface of the item and to transmit reflected light from the surface of the item to the eye of a viewer.

EXAMPLE 31

A method for labeling items, the method comprising:
separating a label from a release liner by using peel plate,
moving the surface of an item in a first direction,
moving the label in a second direction, and
bringing a leading edge of the label into contact with a surface of the item such that the angle between the first direction and the second direction is in the range of 10° to 30°,
wherein the label comprises:
a face layer, and
an adhesive layer,
wherein the face layer comprises semi-crystalline polymeric film, the adhesive layer consists of one or more adhesive sub-layers, a lowermost adhesive sub-layer of said adhesive sub-layers comprises transparent polymeric adhesive, the thickness of the face layer is in the range of 10 μm to 50 μm, the thickness of the adhesive layer is in the range of 8 μm to 25 μm, and the thickness of the adhesive layer is smaller than 95% of thickness of the face layer.

EXAMPLE 32

The method of example 31, wherein the semi-crystalline polymeric film is a polyester film.

EXAMPLE 33

The label of example 31, wherein the polymeric adhesive comprises an acrylic emulsion polymer.

EXAMPLE 34

The method of 33, wherein the release value of the combination of the label and the release liner is higher than 0.15 N in a situation where a sample piece of the label is separated from the release liner at an angle of 180° at a velocity of 1200 inches per minute at the temperature of 25° C., the width of said sample piece being equal to 2 inches.

EXAMPLE 35

The method of example 31, wherein the maximum velocity of the release liner is higher than 1 m/s such that the rate of labeling is higher than 1000 items per minute.

EXAMPLE 36

The method of example 31, wherein the velocity of the release liner is temporarily reduced between labeling a first item and labeling a second item.

EXAMPLE 37

The method of example 31, comprising controlling entrainment of air to an interface between the label and the item by causing longitudinal tension in the label when the leading edge of the label is in contact with the item and when a trailing edge of the label is still in contact with the release liner.

EXAMPLE 38

The method of example 31, wherein the material of the lowermost adhesive sub-layer has been selected to pressurize an air bubble trapped between the label and the item, so as to cause diffusion of air through the face layer of the label.

EXAMPLE 39

The method of example 31, wherein the semi-crystalline polymeric film is a polyester film, and the permeability of the polyester film for air at 25° C. is higher than or equal to 1 $cm^3/m^2 \cdot 24$ hours 100 kPa.

EXAMPLE 40

The method of example 31, wherein an air bubble is formed between the label and the item, and a residual stress of the face layer is arranged to remove the air bubble by causing diffusion of air from the air bubble through the face layer.

EXAMPLE 41

The method of example 31, comprising reducing the size of air bubbles by causing diffusion of air from the air bubble through the face layer during at least 24 hours.

EXAMPLE 42

The method of example 31, wherein the radius of curvature of the item is smaller than 50 mm.

EXAMPLE 43

The method of example 31, comprising pressing the label by a pressing member such that a portion of the label is temporarily bent, wherein the radius of curvature of the bent portion of the label is smaller than 10 mm.

For the person skilled in the art, it will be clear that modifications and variations of the labels, products and the methods according to the present invention are perceivable. The figures are schematic. The particular embodiments described above with reference to the accompanying drawings are illustrative only and not meant to limit the scope of the invention, which is defined by the appended claims.

What is claimed is:

1. A method for labeling items, the method comprising:
    separating a label from a release liner by using peel plate;
    moving a surface of an item in a first direction;
    moving the label in a second direction; and
    bringing a leading edge of the label into contact with the surface of the item such that an angle between the first direction and the second direction is from 10° to 30°;
    wherein the label comprises:
        a face layer; and
        an adhesive layer;
    wherein the face layer comprises semi-crystalline polymeric film, the adhesive layer consists of one or more adhesive sub-layers, a lowermost adhesive sub-layer of said adhesive sub-layers comprises transparent polymeric adhesive, the face layer has a thickness of from 10 μm to 50 μm, the adhesive layer has a thickness of from 8 μm to 25 μm, and the thickness of the adhesive layer is smaller than 95% of thickness of the face layer.

2. The method of claim 1, wherein the semi-crystalline polymeric film is a polyester film.

3. The label of claim 1, wherein the polymeric adhesive comprises an acrylic emulsion polymer.

4. The method of claim 1, wherein the adhesive layer comprises an uppermost adhesive sub-layer, wherein a refractive index of the uppermost adhesive sub-layer is from 80% to 98.5% of a refractive index of the semi-crystalline polymeric film.

5. The method of claim 1, wherein a maximum velocity of the release liner is higher than 1 m/s such that a rate of labeling is higher than 1000 items per minute.

6. The method of claim 1, wherein a velocity of the release liner is temporarily reduced between labeling a first item and labeling a second item.

7. The method of claim 1, wherein the release liner comprises polyethylene terephthalate.

8. The method of claim 1, wherein the lowermost adhesive sub-layer comprises a material that has been selected to pressurize an air bubble trapped between the label and the item, so as to cause diffusion of air through the face layer of the label.

9. The method of claim 1, wherein the semi-crystalline polymeric film is a polyester film, and permeability of the polyester film for air at 25° C. is higher than or equal to 1 $cm^3/m^2 \cdot 24$ hours $\cdot 100$ kPa.

10. The method of claim 1, wherein an air bubble is formed between the label and the item, and a residual stress of the face layer is arranged to remove the air bubble by causing diffusion of air from the air bubble through the face layer.

11. The method of claim 1, comprising reducing the size of air bubbles by causing diffusion of air from the air bubbles through the face layer during at least 24 hours.

12. The method of claim 1, wherein a radius of curvature of the item is smaller than 50 mm.

13. The method of claim 1, comprising pressing the label by a pressing member such that a portion of the label is temporarily bent, wherein a radius of curvature of the bent portion of the label is smaller than 10 mm.

14. The method of claim 1, wherein the face layer has a tensile modulus that is higher than or equal to 4000 MPa in a machine direction.

15. The method of claim 1, wherein the polyester film is polyethylene terephthalate film.

16. The method of claim 1, wherein the item is a transparent container made of polyethylene terephthalate.

17. The method of claim 1, wherein the item is a lacquered aluminum can.

18. The method of claim 1, wherein the label comprises a printed region implemented between the face layer and the adhesive layer, and a perimeter of the printed region of the label has a shape that is substantially different from the shape of the perimeter of the label.

19. The method of claim 1, wherein the label comprises a clear portion to transmit illuminating light to the surface of the item and to transmit reflected light from the surface of the item to the eye of a viewer.

20. The method of claim 1, wherein the label comprises a printed region between the face layer and the adhesive layer, and a distance between the printed region and the surface of the item is from 50% to 95% of the thickness of the face layer.

* * * * *